(12) United States Patent
Barasch

(10) Patent No.: US 9,682,007 B2
(45) Date of Patent: Jun. 20, 2017

(54) SEXUAL MASSAGER COMMUNICATION DEVICE, SYSTEM, AND METHOD

(71) Applicant: Maxine Lynn Barasch, Albany, NY (US)

(72) Inventor: Maxine Lynn Barasch, Albany, NY (US)

(*) Notice: Subject to any disclaimer, the term of this patent is extended or adjusted under 35 U.S.C. 154(b) by 0 days.

(21) Appl. No.: 14/140,435

(22) Filed: Dec. 24, 2013

(65) Prior Publication Data

US 2015/0174000 A1 Jun. 25, 2015

(51) Int. Cl.

| | |
|---|---|
| *A61H 19/00* | (2006.01) |
| *A61H 23/02* | (2006.01) |
| *G06Q 30/00* | (2012.01) |
| *G06Q 50/10* | (2012.01) |
| *A61H 23/00* | (2006.01) |
| *H04W 4/12* | (2009.01) |
| *H04L 12/58* | (2006.01) |

(52) U.S. Cl.
CPC ............ *A61H 19/40* (2013.01); *A61H 19/00* (2013.01); *A61H 19/30* (2013.01); *A61H 23/004* (2013.01); *A61H 23/0263* (2013.01); *G06Q 30/00* (2013.01); *G06Q 50/10* (2013.01); *H04W 4/12* (2013.01); *A61H 2201/0207* (2013.01); *A61H 2201/0214* (2013.01); *A61H 2201/0285* (2013.01); *A61H 2201/501* (2013.01); *A61H 2201/5012* (2013.01); *A61H 2201/5025* (2013.01); *A61H 2201/5041* (2013.01); *A61H 2201/5043* (2013.01); *A61H 2201/5046* (2013.01); *A61H 2201/5061* (2013.01); *A61H 2201/5082* (2013.01); *A61H 2201/5097* (2013.01); *A61H 2230/00* (2013.01); *A61H 2230/065* (2013.01); *A61H 2230/305* (2013.01); *A61H 2230/505* (2013.01); *A61H 2230/655* (2013.01); *H04L 51/04* (2013.01)

(58) Field of Classification Search
CPC .. A61F 5/00; G06K 9/72; A61H 19/40; A61H 19/44; A61H 19/34; A61H 19/50; A61H 21/00

See application file for complete search history.

(56) References Cited

U.S. PATENT DOCUMENTS 6,793,619 B1 * 9/2004 Blumental .................... 600/38
2004/0082831 A1 4/2004 Kobashikawa et al.
(Continued)

FOREIGN PATENT DOCUMENTS

| | | |
|---|---|---|
| CN | 102883678 A | 1/2013 |
| DE | 10052368 A1 | 5/2002 |
| EP | 2129351 A2 | 12/2009 |

*Primary Examiner* — Christine H Matthews
(74) *Attorney, Agent, or Firm* — Maxine L. Barasch; Keohane & D'Alessandro, PLLC

(57) ABSTRACT

Embodiments of the present invention provide a sexual massager that is configured to communicate (directly or indirectly) a message to a target in response to an occurrence of an event. The sexual massager may be a sexual aid. Messages may be generated based on various pre-sets and/or user selections established to determine a type of message, content for inclusion in the message, the target, the event, and other customizations. The content of the messages may be generated based on a variety of options, such as random, customized, or based on usage parameters, such as biometric, device settings, and temporal information.

17 Claims, 19 Drawing Sheets

(56) References Cited

U.S. PATENT DOCUMENTS

| | | |
|---|---|---|
| 2005/0119702 A1 | 6/2005 | Simmons |
| 2006/0079732 A1* | 4/2006 | Blumenthal .................... 600/38 |
| 2010/0034471 A1* | 2/2010 | Dawe ............................ 382/229 |
| 2011/0133910 A1 | 6/2011 | Alarcon |
| 2014/0155225 A1 | 6/2014 | Sedic |

* cited by examiner

| Intensity | Rating | Attribute word | Content Item |
|---|---|---|---|
| 1 | 3 | 0x0 | Hope you feel better now. |
| 3 | 5 | 0x1 | Hey $, that was too fast! |
| 5 | 7 | 0x2 | I love a hard grip! |
| 4 | 8 | 0x0 | That was hot!! You should check out www.xxx.yyy |

Figure 11

SEXUAL MASSAGER COMMUNICATION DEVICE, SYSTEM, AND METHOD

FIELD OF THE INVENTION

The present invention relates generally to sexual massagers, and more particularly, to sexual massagers with communication capability.

BACKGROUND

Sexual massagers are used by women and men, sometimes alone, and sometimes with one or more partners, to stimulate sexual pleasure. Although conventional sexual massagers create physical stimulation/pleasure, they leave a void as to emotional stimulation, for example, kind words, discussion about the sexual activity, etc. like that which typically occurs after intercourse with a partner.

SUMMARY

In a first aspect, embodiments of the present invention provide a sexual massager having a vibration unit, and a processor configured to wirelessly transmit a message including at least one item of content to a target in response to an occurrence of an event.

In a second aspect, embodiments of the present invention provide a system having a bus; a processor coupled to the bus; and a memory medium coupled to the bus, the memory medium having instructions to: receive user input of at least one of a message type, a target, an event, and a content selection method; detect an occurrence of the event based on data communicated over a network from a sexual massager; and communicate at least one message of the at least one message type to the target in response to the detection of the occurrence of the event, the message including at least one item of content selected according to the content selection method.

In a third aspect, embodiments of the present invention provide a computer-implemented method of establishing an association between a sexual massager and at least one user-specified target, wherein the sexual massager includes a vibration unit; and sending a message to the at least one target in response to an occurrence of a user-specified event

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

FIG. 10A shows a flow diagram of a method for generating content for a message based on duration of use.

FIG. 10B shows a flow diagram of a method for generating content for a message based on grip pressure.

FIG. 10C shows a flow diagram of a method for generating content for a message based on user heart rate.

FIG. 10D shows a flow diagram of a method for generating content for a message based on temperature setting.

FIG. 11 shows an example database table for storing and organizing items of content.

DETAILED DESCRIPTION OF EMBODIMENTS OF THE INVENTION

Figure 1:
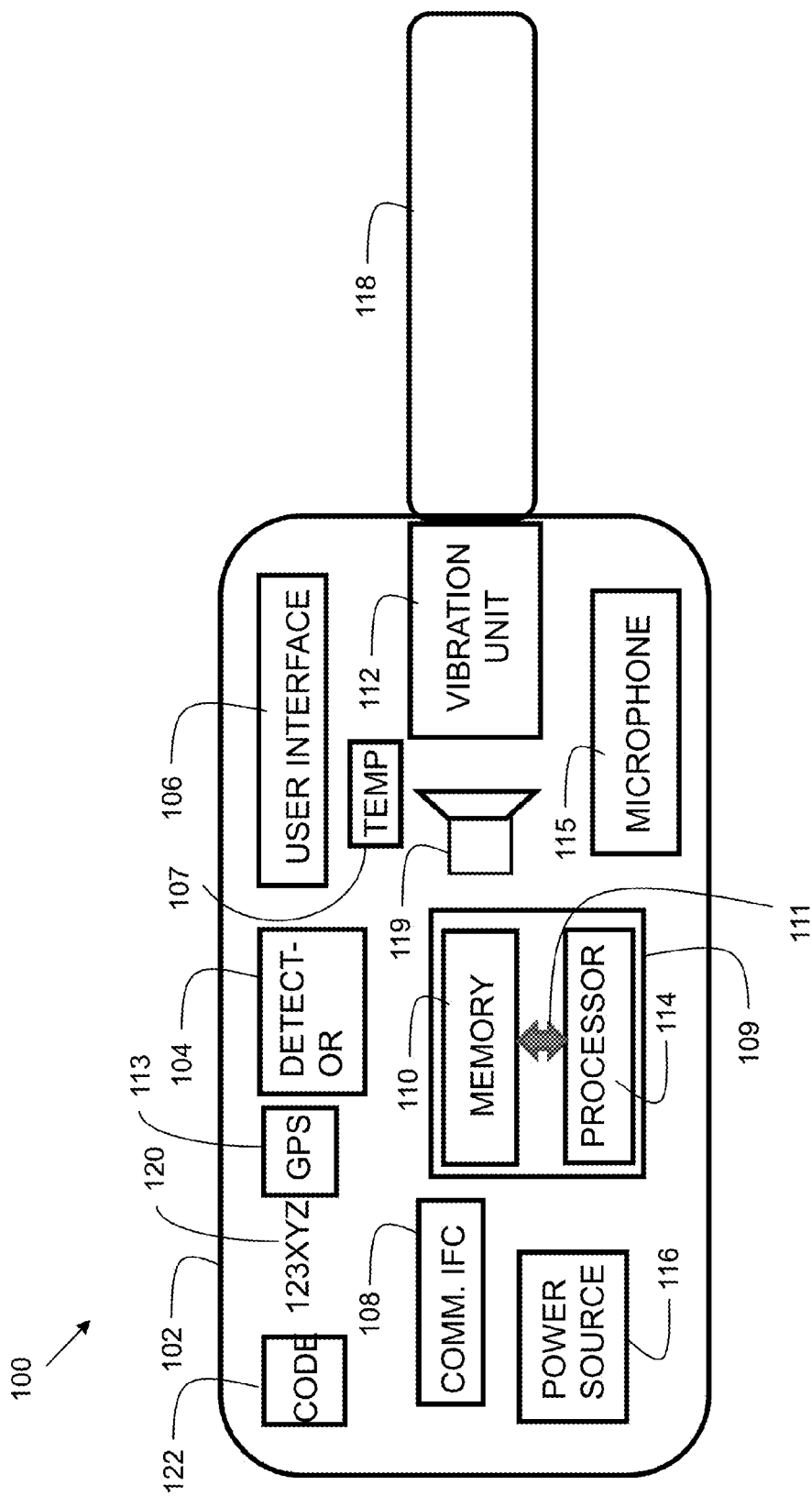
FIG. 1 shows a block diagram view of a sexual massager in accordance with embodiments of the invention.

Embodiments of the present invention provide a sexual massager that is configured to communicate (directly or indirectly) a message to a remote device in response to an occurrence of an event. The sexual massager may be a sexual aid. Messages may be generated based on various pre-sets or user selections, established to determine the target, event, content, message type, and other customizations. Content of the messages may be generated based on a variety of options, such as random, customized, or based on usage parameters, such as biometric, temporal, and user settings information.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, integers, steps, operations, elements, components, and/or groups thereof.

"Sexual massager" or "massager" as used herein refers to a device configured to induce sexual stimulation to one or more human body parts for example, without limitation, genetalia, anus, or breasts. Typically, such stimulation is induced via at least a vibration unit, but may include, instead of or in addition, further apparatus(es) to enhance such stimulation, for example, without limitation, beads, various textures of the housing, rotation of portions of the housing, etc.

"Message" as used herein is a communication. A message is of a "message type", such as, for example, an email message, a text message (such as short message service (SMS) message), an instant message (such as an AOL® instant message), a multimedia message (such as MMS message), a voice message, a voice mail message, a video message, an automated telephone call, a voice-over IP call, a social media message (such as a Facebook® message, Twitter Message®, Linked-In Message®, etc.), a social media post (such as a post to a Facebook® Wall®, a "tweet" on Twitter®, etc.), a blog post, or any other form of message or social media post, etc. now known or hereafter developed.

The "content" of the message may include one or more of text (e.g., a phrase, etc.), image (for example, photograph, illustration, etc.), video, audio (e.g., MP3, LCPM, or other suitable format), webpage (implemented with HTML, Java, or any other suitable language), website link, and any other suitable form of content. A particular instance of such content (e.g., a particular phrase, image, photo, illustration, video, audio clip, webpage, or website link etc.) may also be referred to herein as an "item of content" or a "content item".

A "target" is an intended recipient address/destination of a message. The target may be a phone number, email address, voicemail box, social media receptacle (like Facebook® private messenger inbox, Twitter® private messenger inbox, Facebook® Wall®, Twitter feed, Linked-In® account, etc.), instant message inbox (e.g., AOL® instant messenger inbox), or any other address/destination for receipt of messages now known or hereafter developed.

An "event" is a trigger for sending a message, for example, to the target. An event may be, for example, deactivation of the vibration unit of the sexual massager, activation of the vibration unit, powering off the sexual massager, powering on the sexual massager, and/or a predetermined duration of time elapsing after any of the aforementioned events. These are examples, and any other suitable event is included within the scope of the invention.

Referring now to FIG. 1, there is shown an example of sexual massager 100 in accordance with some embodiments of the present invention. The massager has a housing 102, which may be made of plastic, glass, composite material, or any other suitable material now known or hereafter developed. A power source 116 receives and/or supplies electricity to power the various other components, which may include communications interface 108, computer 109, detector 104 (which may be biometric or any other suitable sensor/encoder/timer for sensing usage parameters), user interface 106, speaker 119, and microphone 115. Furthermore, sexual massager 100 may have a vibration unit 112 which may be mechanically coupled to shaft 118. In some embodiments, the vibration unit can be substituted with another suitable massage mechanism. Some embodiments may include more or fewer features/components than those described/shown herein without departing from the scope and purpose of the invention.

Typically, shaft 118 of sexual massager 100 is configured for stimulation of a human penis, stimulation of/insertion into a human vagina or anus, and/or to apply pressure to one or more of those areas. In some embodiments, the housing is shaped to mimic the look and/or feel of a human penis. In some embodiments, the shaft 118 may be shaped like a tube, a "bullet", an "egg", a "ring", or any other suitable shape, each of which is included within the scope of the invention. In some embodiments, the shaft and the housing are one and the same (i.e. a single apparatus), or are substantially contiguously connected. In some embodiments, more than one shaft may be included.

The vibration unit 112 is any suitable apparatus for producing oscillation of sexual massager 100. A vibration unit 112 may be a geared motor mechanism, which may have an asymmetrical load affixed to a rotating shaft, a linear resonant actuator, or a pancake vibration motor. It will be recognized that any suitable vibration or massage mechanism now known or hereafter developed may be substituted for, or used in addition to, the examples disclosed herein without departing from the scope and purpose of the present invention.

In some embodiments, the power source 116 includes batteries, which may be replaceable, or internally sealed rechargeable batteries. In some embodiments, the power source may be AC or DC power. In still other embodiments, the power source may be a combination of AC, DC and/or battery power. It will be recognized that any suitable powering mechanism now known or hereafter developed may be substituted for, or used in addition to, the examples disclosed herein without departing from the scope and purpose of the present invention.

User interface 106 can include any suitable mechanism for sexual massager 100 to receive input from a user (and in some embodiments, to present feedback to the user). In some embodiments, the input may be selection of power on/power off, selection of the vibration settings (e.g., high, medium, low, or a particular pattern, etc.), and/or selection of other settings such as, for example, a temperature of a heating/cooling mechanism 107 within the sexual massager 100, etc. In some embodiments, user interface 106 includes at least one button, slider switch, screen, keypad, any combination thereof, or any other suitable input interface, now known or hereafter developed. In embodiments including a screen, the screen can be a light-emitting diode (LED) display, liquid crystal display (LCD), plasma, or any other suitable display mechanism. In some embodiments, the screen may be a "touch screen". In some embodiments, input may be entered additionally or alternatively through voice recognition via microphone 115.

In some embodiments, sexual massager 100 has an on-board or attached (via wires or wirelessly) computer 109 including a processor 114, memory 110, and bus 111. Memory 110 may be a computer-readable storage medium, such as flash, ROM, battery-backed SRAM, and/or other suitable technology now known or hereafter developed. In some embodiments, memory 110 may be non-transitory. Processor 114 is configured and disposed to access instructions stored in memory 110 and execute them to provide one or more of the various functionalities of sexual massager 100.

It will be recognized that the features of sexual massager 100 described herein are examples, and that some embodiments may include more or fewer features.

Figure 2:
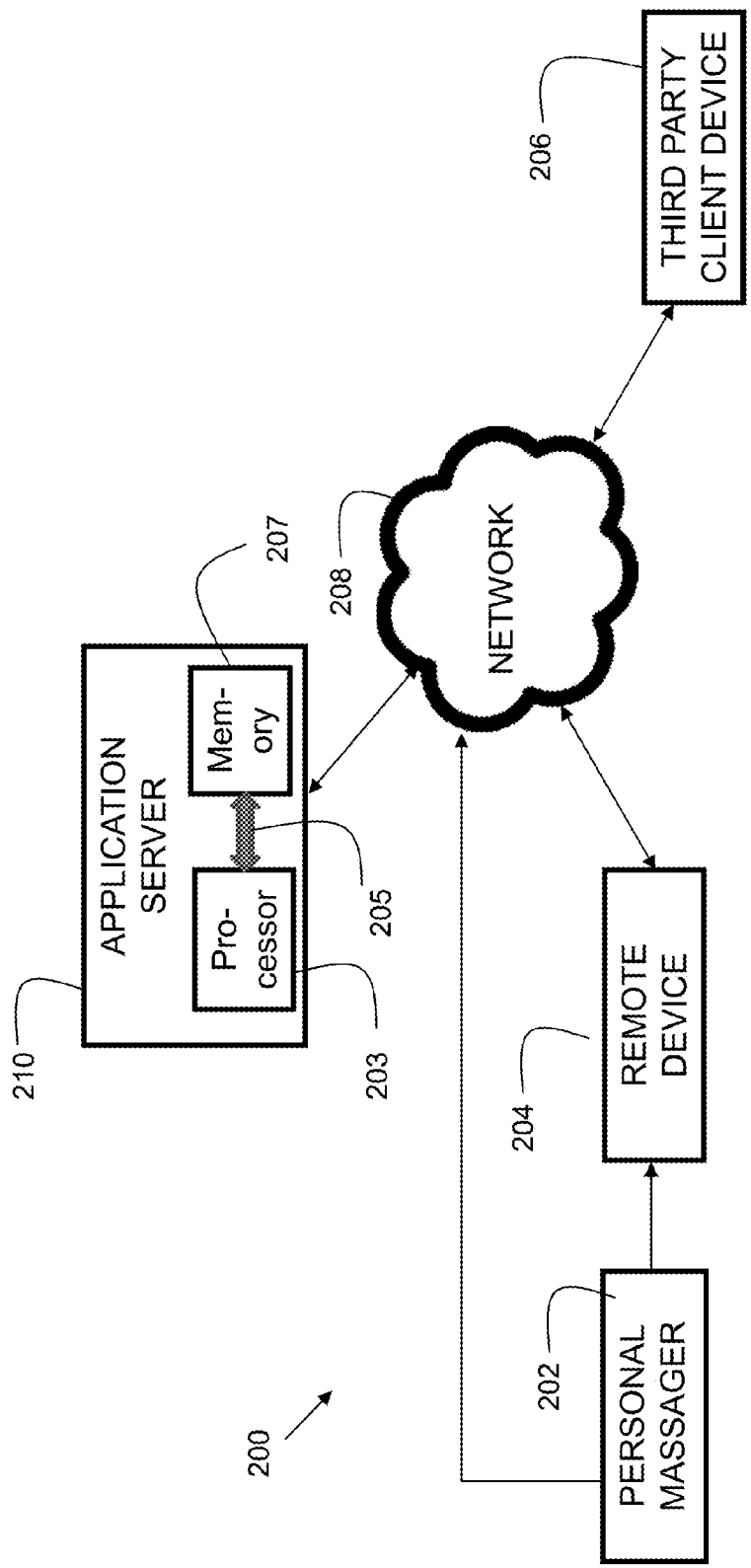
FIG. 2 shows a network on which embodiments of the sexual massager may communicate a message.

Referring now also to FIG. 2, in some embodiments, sexual massager 202 may be configured to communicate (directly or indirectly) over a network with an application server 210. Sexual massager 202 may have all or any subset of the features of sexual massager 100. Application server 210 includes a processor 203, bus 205, and memory 207 to hold the repository and instructions to provide one or more of the various functionalities of sexual massager 202. In some embodiments, sexual massager 202 is configured to communicate with application server 210 directly through network 208. For example, in such embodiments, sexual massager 202 includes a communication interface 108 for wirelessly transmitting information over network 208 to application server 210. In some embodiments, sexual massager 202 may communicate with a remote/client device 204 (such as a mobile phone, tablet computer, or any other suitable device now known or hereafter developed), which in turn communicates with application server 210. In some embodiments, communication interface 108 may be a near field communication protocol like Bluetooth® or Zigbee®, or any other suitable technology now known or hereafter developed, for wirelessly transmitting information over network 208 to remote device 204. In embodiments, network 208 may be any suitable network such as a wide area network (WAN), a local area network (LAN), a virtual private network (VPN), a cloud computing network, the Internet, any combination thereof, and/or any other suitable network now known or hereafter developed. Application server 210 may receive feedback (directly or indirectly) from the sexual massager 202, and in response, communicate a message to a target, for example, without limitation, for display on the remote device 204 or another client device 206. It will be recognized that the components shown in FIG. 2 are meant to be examples, and in some embodiments, more or fewer components may be connected to the network. It will also be recognized that the features of sexual massager 202 described herein are examples, and that some embodiments may include more or fewer features.

In some embodiments, much of the functionality that is described herein as executed from the application server (e.g., 210 of FIG. 2), can instead be executed from on-board computer (e.g., 109 of FIG. 1). A sexual massager in accordance with such embodiments may communicate messages directly from the computer 109 to the target over the network 208.

In yet other embodiments, the sexual massager may be a "self-contained" system (i.e., function without network connectivity) with user interface 108 including a screen 106 and/or a speaker 119 for delivering the message to a user directly from the sexual massager 100. In such embodiments, the memory 110 may contain a plurality of predefined items of content in a repository for presentation to the user. The responses may then be decoded by processor 114 and presented via speaker 119 and/or user interface 106. In such embodiments, however, sexual massager 100 may still include communication interface 108 providing network (e.g., network 208 of FIG. 2), connectivity for alternatively, or in addition to communicating a message to a user interface/screen or from a speaker, directly sending messages to a target from sexual massager 100 (see also FIG. 2), accessing software updates, or connecting to an application server.

Figure 3:
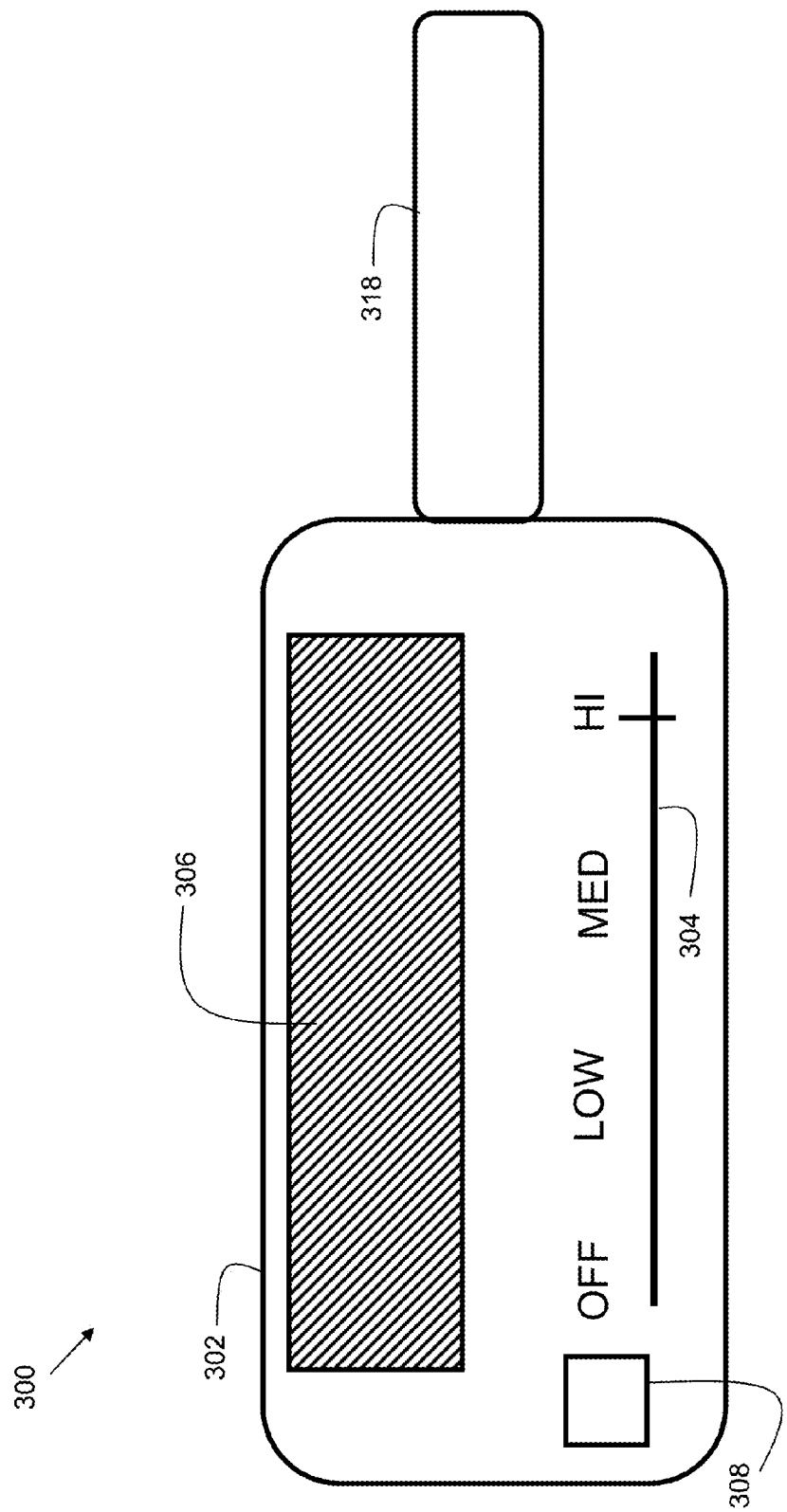
FIG. 3 shows a sexual massager in accordance with embodiments of the invention.

FIG. 3 shows sexual massager 300 in accordance with embodiments of the invention. Sexual massager 300 includes housing 302. Disposed on housing 302 is a user interface, shown here as (slider) controls 304, and biometric sensor 306.

Controls 304 may include vibration settings. Additionally, controls 304 may include temperature settings (if the massager includes a mechanism 107 for temperature control, such as a heating/cooling element) or light settings (if the massager includes a mechanism 308 for illumination). Illumination/light source mechanism 308 may include incandescent light, fluorescent light, black light, CFL, light emitting diode (LED), or any other suitable lighting). In some embodiments, the controls may include more or fewer settings options.

During use of sexual massager 300, one or more usage parameters may be measured by a detector, for example, a sensor, encoder, or any other suitable mechanism. For example, the amount of time the sexual massager is powered up may be measured. Alternatively, or in addition, one or more physiological parameters of a user may be measured. During use of sexual massager 300, the user's hand or fingers may make contact with biometric sensor 306, such that one or more such physiological parameters can be measured. The physiological parameters include, but are not limited to, heart rate, pulse, blood pressure, body temperature, skin conductivity, moisture, grip pressure, and any other suitable parameters. For example, the biometric sensor 306 may include a strain gauge (which serves as a grip pressure sensor). The biometric sensor 306 may include electrodes for contact with the user's skin to measure the heart rate, blood pressure, body temperature (thermometer), and/or pulse electronically (which serves as a heart rate and/or pulse sensor). The biometric sensor may include sensors, which sense moisture (for example, sweat or other bodily fluids). It will be recognized that any suitable physiological parameters may be measured with sensors or other mechanisms now know or hereafter developed without departing from the scope and purpose of the present invention. Yet other usage parameters could be detected (for example, by use of a detector like 104 in FIG. 1) during a session, examples of which include the speed/intensity of the vibration, the pattern of the vibration, a brightness and/or pattern (i.e., strobe, color-changes, etc.) of an illumination/light source mechanism, a temperature of an on-board heating/cooling mechanism, amount of time the vibration unit was activated, and any other suitable setting.

It will be recognized that the features of sexual massager 300 described herein are examples, and that some embodiments may include more or fewer features.

Figure 4:
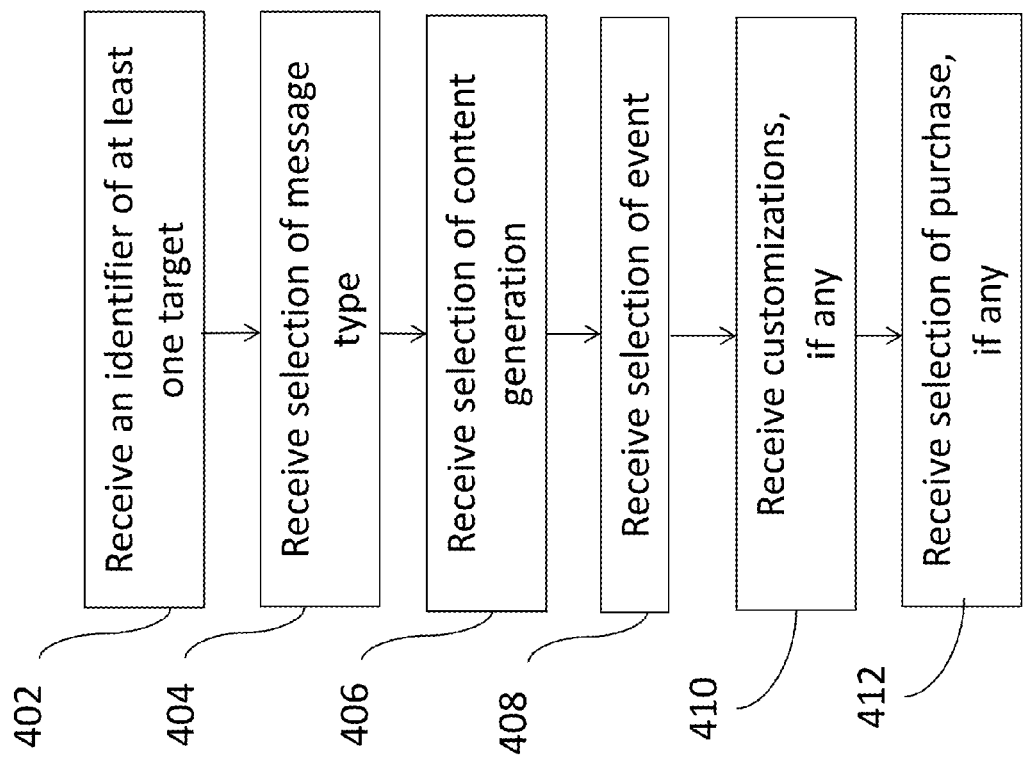
FIG. 4 shows a flow diagram of a method for programming operation of the sexual massager/system.

Referring now to FIG. 4, there is shown a flow diagram of a method for programming operation of the sexual massager/system by a user. In step 402, the user is prompted to enter a target. The target is an intended recipient address or destination of a message. In some embodiments, multiple targets may be established. In step 404, the user is prompted to select a type of message she wishes to be sent. In step 406, the user is prompted to select a method of content generation for the message. In step 408, the user is prompted to enter a (triggering) event. In step 410, the user is prompted to enter other customizations, if any. In step 412, the user is prompted to enter automated purchase information, if any. It will be recognized that in some embodiments of the invention, more or fewer steps could be included, some of the steps may be performed simultaneously, and/or the order of the steps may be different. It will also be recognized that in some embodiments, one or more of these options can be default or standard settings, rather than user-defined. For example, the user may only be required to enter a target, while the content, event, and message type may be pre-programmed without input from the user.

Figure 5:
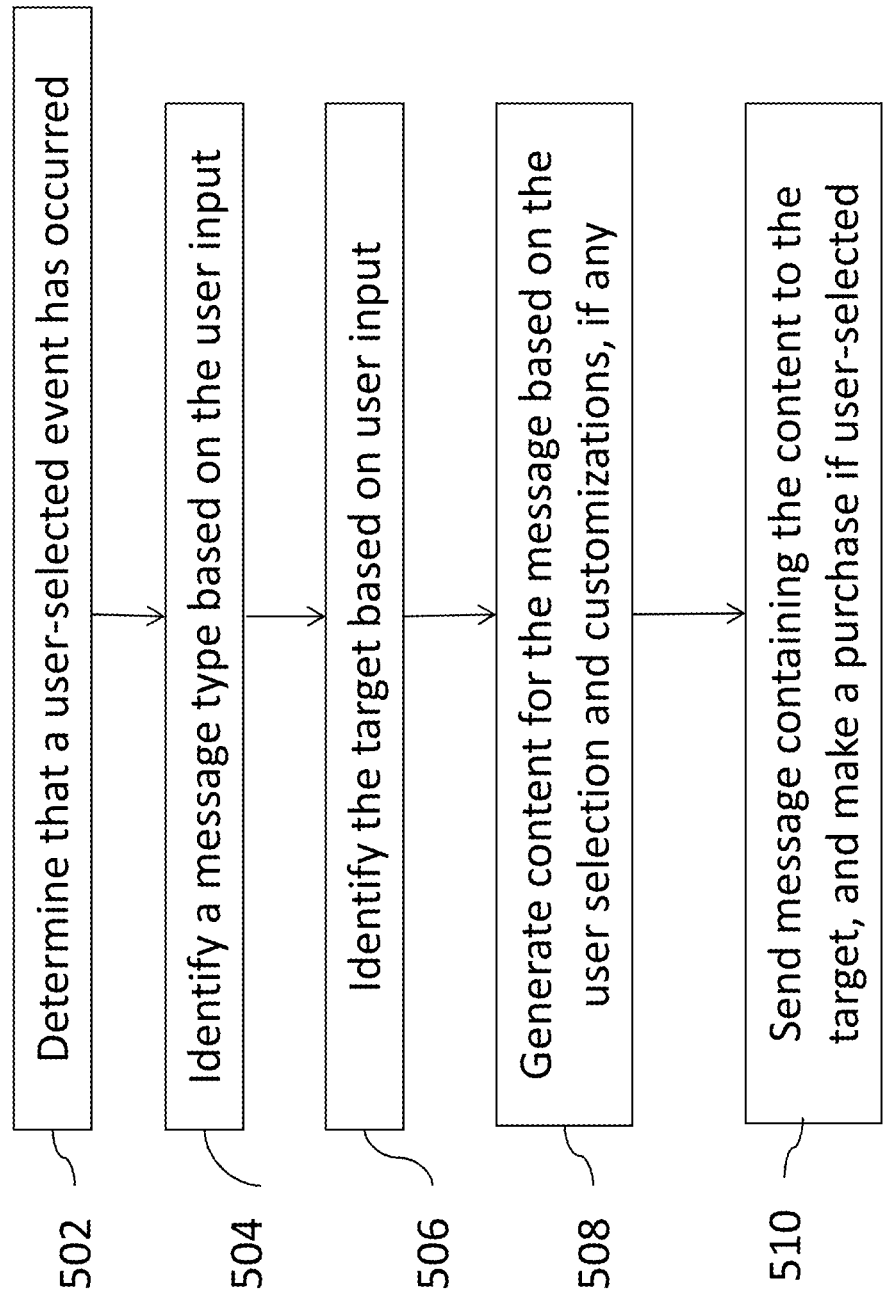
FIG. 5 shows a flow diagram of a method for generating and sending a message to a target.

Referring now to FIG. 5, there is shown a method flow diagram of a method for generating and sending a message to a target. In step 502, a determination is made that a user-selected event has occurred. In step 504, a message type is determined based on user input. In step 506, a target is identified based on user input. In step 508, content for the message is generated based on a user-selected method and customizations, if any. In step 510, a message of the identified message type containing the generated content and having the determined customizations is sent to the target(s) (and an automated purchase made if pre-selected by the user) in response to the occurrence of the event(s). It will be recognized that in some embodiments of the invention, more or fewer steps could be included, some of the steps may be performed simultaneously, and/or the order of the steps may be different.

Each of these elements is described in further detail herein below.

In embodiments where the sexual massager is self-contained, no registration of the sexual massager may be necessary. A user may simply power on the sexual massager and enter her/his selections via a user interface associated with the sexual massager. In some embodiments, although the sexual massager may contain various capabilities on-board, such as a content repository, the sexual massager may still be enabled to communicate with a remote device or network (wirelessly or wired, e.g., USB) for sending messages, accessing an application server, and/or accessing software updates, etc., so registration capabilities may still be provided.

In embodiments where the sexual massager communicates with an application server, a user may need to visit a website of a solution service provider to access the application server. In practice, for example, a user either may enter a domain name of a website associated with the solution service provider into an appropriate field of a web browser appearing on an interface of a computing device or click on the domain name from a search engine or other page. It will be recognized that these methods of accessing the application server are examples, and that any suitable method is included within the scope of the invention. Upon the website of the solution service provider appearing on the screen, the user may then be prompted to create an account, if she has not done so previously. Once the user is logged into her/his account, she may be prompted to register/associate her/his sexual massager with her/his account, if she has not done so previously.

Figure 6:
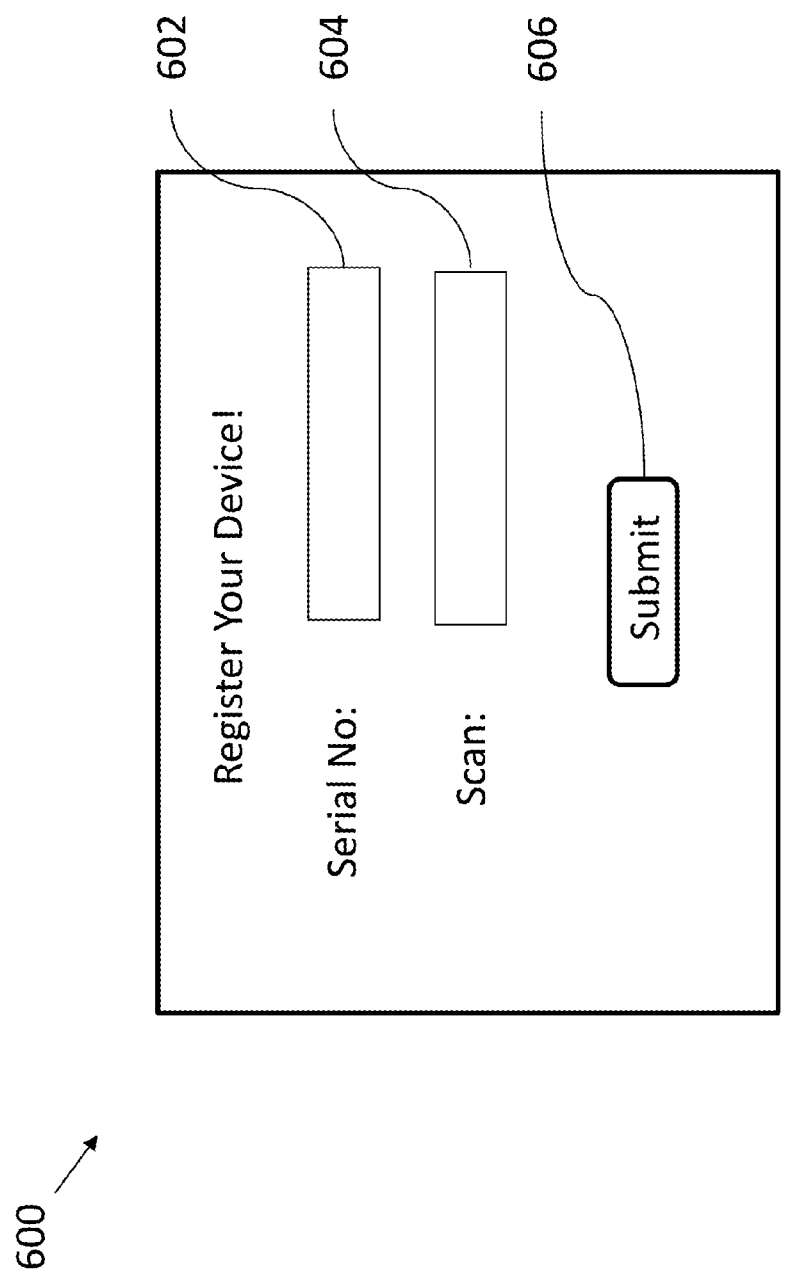
FIG. 6 shows a flow diagram of a user interface for registering the sexual massager.

Referring now to FIG. 6, there is shown a user interface 600 for prompting a user to register her/his sexual massager. In practice, each sexual massager may have a unique label/tag/identifier identifying the particular massager. The tag/label/identifier may be an alphanumerical/symbolic sequence, e.g., a serial number 120 (FIG. 1), to be entered manually by a user, or a barcode, a radio-frequency identification (RFID) tag/label, a quick response (QR) code, such as code 122 (FIG. 1) to be scanned using a camera or other device. It will be recognized that these identifiers are examples, and that any other suitable identifier now known or hereafter developed are included within the scope of the invention.

At 602, there is shown a mechanism (e.g., a field) for receiving a manual input of the identifier of the sexual massager (e.g., a serial number). At 604, there is shown a mechanism for receiving a scan of a code (QR code) identifying the sexual massager. At 606, there is shown a mechanism (e.g., a button) for submitting the information for transmission to the application server (e.g., 210 of FIG. 2) through the network (e.g., 208 of FIG. 2). In embodiments, the application server 210 associates the sexual massager as identified by the identifier with an account of the user, the account having one or more message preferences, as input/selected by the user. Once the user has registered her/his sexual massager with the application server, the user may input other selections to the user interface presented while she is logged into her/his online account with the solution service provider.

Figure 7:
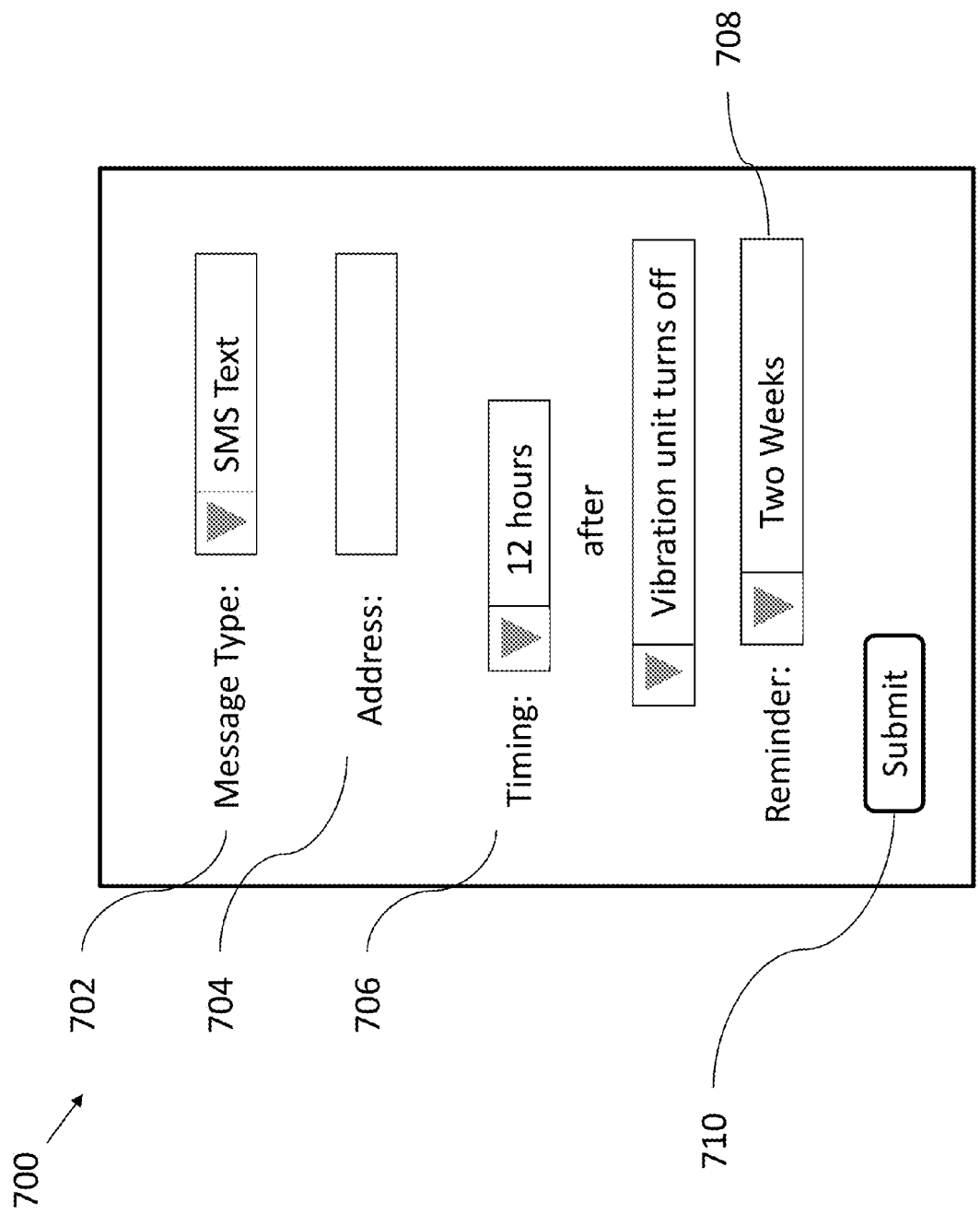
FIG. 7 shows a user interface for prompting a user to enter a message type, target, event, and reminder.

Referring now to FIG. 7, there is shown a user interface 700 for prompting a user to enter a message type, target, event, and reminder. At 702, there is shown a mechanism (e.g., a drop box), wherein a user may make a message type selection. Message type selection may be achieved by a user inputting one or more types of message she/he wishes to be sent. Message type options are, for example, an email message, a text message (such as short message service (SMS) message), an instant message (such as an AOL® instant message), a multimedia message (such as MMS message), a voice message, a voice mail message, a video message, an automated telephone call, a voice-over IP call, a social media message (such as a Facebook® message, Twitter Message®, Linked-In Message®, etc.), a social media post (such as a post to a Facebook® Wall®, a "tweet" on Twitter®, etc.), a blog post, or any other form of message now known or hereafter developed.

At 704, there is shown a mechanism (e.g., a field) for receiving a target. In some embodiments, there may be multiple targets entered for simultaneous or in-tandem messages. The target may be a phone number, email address, voicemail box, social media receptacle (like Facebook® private messenger inbox, Twitter® private messenger inbox, Facebook® Wall®, Twitter account, Linked-In® account, etc.), instant message inbox (e.g., AOL® instant messenger inbox), or any other address for receipt of messages now known or hereafter developed. An "event" is a trigger for sending a message, for example, to the target.

At 706, a mechanism (e.g., drop box(es)) is shown for receiving an event to trigger sending of the message(s). Event selection may be achieved by a user selecting an event which will trigger sending of a message(s). Examples of events are deactivation of the vibration unit of the sexual massager, activation of the vibration unit, powering off the sexual massager, powering on the sexual massager, and/or a predetermined duration of time elapsing after any of the aforementioned events. These are examples, and any other suitable event is included within the scope and purpose of the invention. A default setting may be 1 hour after deactivation of the vibration unit of the sexual massager. It will be recognized that these events are examples, and any other suitable event is included within the scope and purpose of the present invention.

At 708, there is shown a mechanism (e.g., a field) for setting a reminder. Optionally, the reminder may be associated with a particular message or message type. The reminder may be established, such that a random or specific "reminding content item" is set as a message to a target in response to a "reminder event", which may be, for example, the application server detecting an elapse of time of a predetermined duration (e.g., two weeks) from the last use of the sexual massager. When the reminder event occurs, e.g., the predefined duration elapses, a reminding item of content, such as a phrase like "Where have you been?", "Is everything OK?", "I miss you", etc., may be sent as content in a message.

At 710, there is a mechanism (e.g., a button) for submitting the information for transmission to the application server (e.g., 210 of FIG. 2) through the network (e.g., 208 of FIG. 2).

Figure 8:
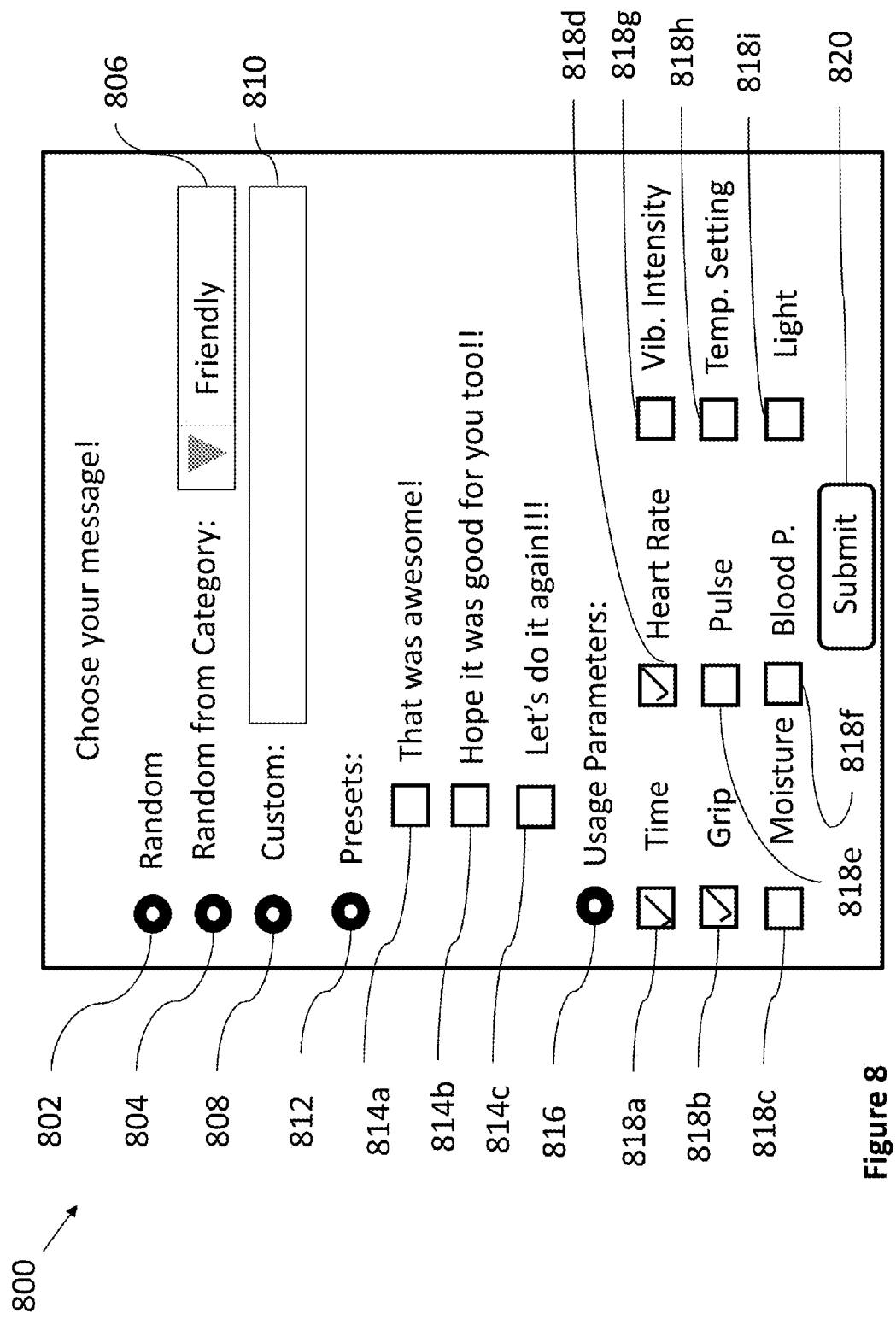
FIG. 8 shows a user interface for prompting a user to make content generation selections.

Referring now to FIG. 8, there is shown a user interface 800 for prompting a user to make content generation method selections. The user may make such selections by choosing among a variety of method options, as more fully described with respect to 802-818e below.

At 802, there is shown a mechanism (e.g., a radio button) for receipt of a selection corresponding to random computer-generated content. The application server may automatically generate messages using a content repository having a pool/bank of preset items of content, e.g., instances of phrases, images, photos, illustrations, videos, audio clips, webpages, website links, and/or any other suitable items of content now known or hereafter developed.

At 804, there is shown a mechanism (e.g., a radio button) for receipt of a selection corresponding to random content from a category. Upon selection of such radio button, a mechanism (e.g., a drop box), shown herein at 806, may be activated from which a user may choose one or more categories discussed further herein below.

At 808, there is shown a mechanism (e.g., a field) for receipt of a selection of a customized, or user-created, item of content. A user may input customized items of content of her/his own, which are saved to the repository, and made available to the user, and in some embodiments, for selection by other users as well. At 810, a mechanism (e.g., a field) is shown for capturing the input (text for the message, upload of a multimedia video, etc.) from the user.

At 812, there is shown a mechanism (e.g., a radio button) for receipt of an election of preset content. At 814a-814c, there is shown mechanisms (e.g., check boxes) for receipt of selections from a set of pre-set items of content. It will be recognized that in some implementations, more or fewer than three pre-set messages may be provided.

At 816, there is shown a mechanism (e.g., a radio button) for receipt of an election of content based on detected usage parameters. At 818a-818i, there are shown mechanisms (e.g., check boxes) for receipt of selections of particular usage parameters for content generation. Example parameters shown are duration between activation and deactivation of the vibration unit, i.e. time 818a, grip pressure 818b, amount of moisture 818c, heart rate 818d, pulse 818e, blood pressure 818f, vibration intensity 818g, temperature setting 818h, and light 818i. These are examples, and all other feasible usage parameters are included within the scope of the invention.

It will be recognized that these options are examples, and any other suitable options are included within the scope of the present invention. At 820, there is shown a mechanism (e.g., a button) for submitting the information for transmission to the application server (e.g., 210 of FIG. 2) through the network (e.g., 208 of FIG. 2).

Figure 9:
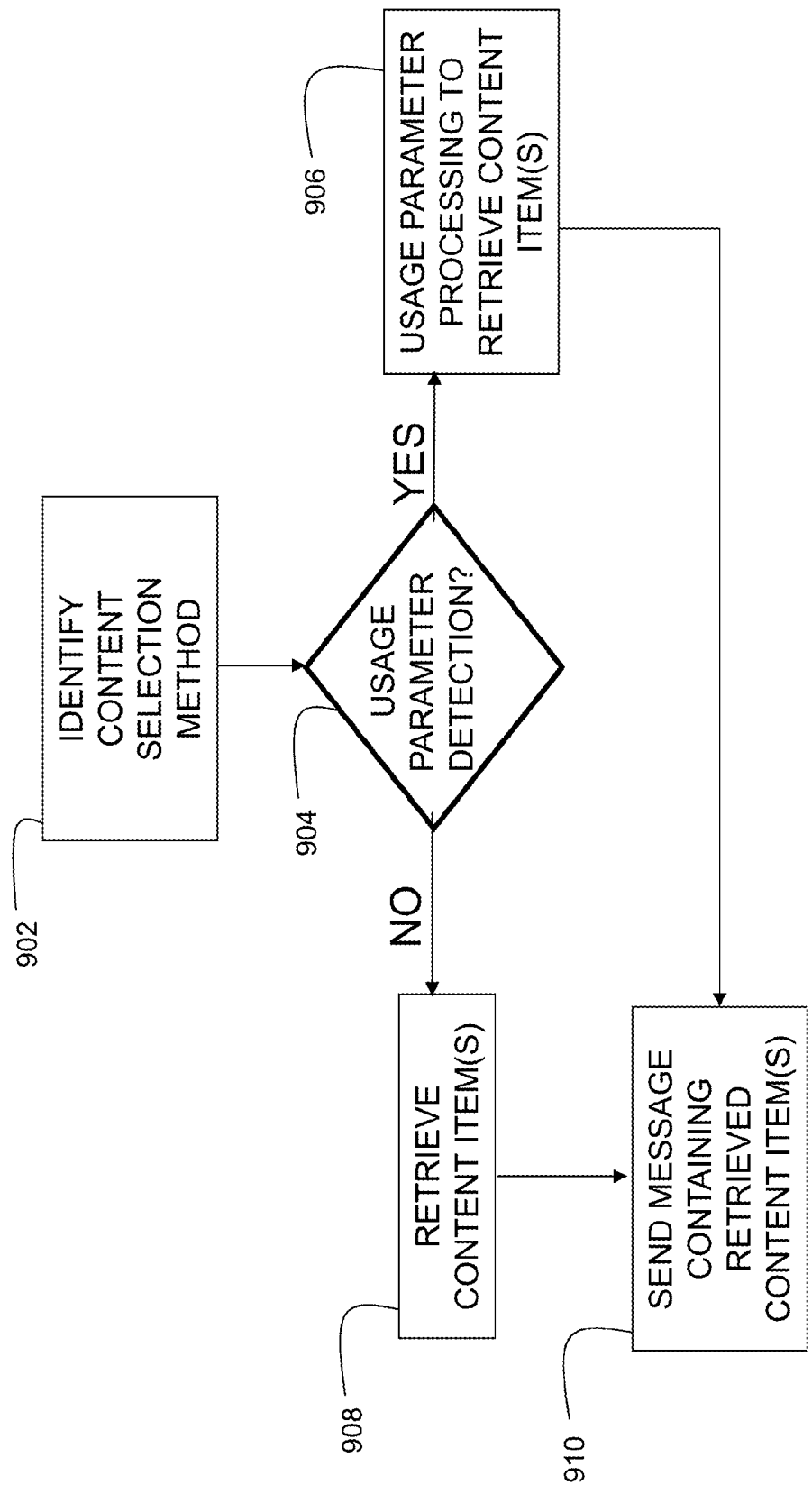
FIG. 9 shows a flow diagram of a method for generating content.

Referring now to FIG. 9, there is shown a flow diagram of a method for generating content. It will be recognized that this method is an example, and that any other suitable method is included within the scope of the invention. At 902, a determination is made as to which content selection method is to be used for the message based on previously established user preferences (e.g., received at user interface 800 of FIG. 8). Examples of method options include, but are not limited to, random, "random from category", customized, pre-set, or usage parameter detection. If at 904, the usage parameter detection option is determined, the process continues to usage parameter processing 906, more fully described with respect to FIGS. 10A-10D. If at 904, usage parameter detection is not selected, one or more content items is retrieved at 908 by the selected method. If the selected method is random, content from the content repository is randomly retrieved. If the selected method is "random from category", one or more content items from the associated category is retrieved, as more fully described herein below. If the selected method is custom, one or more custom content items is retrieved. If the selected method is pre-set, one or more of the selected pre-set content item(s) is retrieved. At 910, the retrieved content item(s) is sent as a message to a target in response to an event occurrence.

In some embodiments, in which "random from category" is selected, content items are randomly selected from the at least one chosen category. In such embodiments, content stored in a message repository is categorized according to a schema. A schema could be based on, for example, levels of "eroticism". The categorizations may be based on pre-set defaults (e.g., as set by a manufacturer) and/or an analysis of user ratings of the items of content. For example, users could be asked to rate the content of messages based on level of eroticism, where the level is graded on a numerical scale of 1 to 10, with 1 being sterile, 3 being friendly, 5 being flirty, 7 being romantic, and 10 being erotic. It will be recognized that these categorizations are meant to be examples and any suitable categorization schema is included within the scope of the present invention. In some embodiments, rather than the items of content being randomly selected from the category, items of content from the particular category, or from all of the categories (e.g., in tandem), may be selected from a queue or via any other suitable mechanism.

Referring now to FIGS. 10A-10D, there are shown flow diagrams of methods for generating content for a message based on usage parameter detection (e.g., 816 of FIGS. 8 and 906 of FIG. 9). It will be recognized that the usage parameters chosen for illustration in such figures as well as the associated methods shown herein are examples, and that any suitable usage parameters and associated methods are included within the scope of the invention. Such methods can account for one or more usage parameters including, without limitation, temporal (e.g., duration between activation and deactivation of the vibration unit of the sexual massager), a set of device settings (e.g., a temperature setting of a heating/cooling mechanism (e.g., 107 of FIG. 1) associated with the sexual massager during the use, and/or a setting of an illumination mechanism associated with the sexual massager, etc.), and/or a set of (one or more) physiological parameters. The physiological parameters may include, without limitation, heart rate, blood pressure, pulse, body temperature, skin conductivity, moisture, grip pressure, and any other suitable physiological parameters. For example, the sexual massager may include a detector (104 of FIG. 1), which may be a timer and/or at least one biometric sensor (e.g., 306 of FIG. 3) and/or at least one settings encoder. In some embodiments, the usage parameter(s) to be included within the method may be a preprogrammed or default selection, and/or in some embodiments, a user may select which usage parameters will be included within the method (e.g., 818a-818i of FIG. 8). In some embodiments, a user may enter demographic or preference information to the user interface of the sexual massager or into an appropriate mechanism at her/his account, so that the thresholds as more fully described below are set appropriately for her/his gender, age, or other demographic, or according to her/his preferred threshold levels.

Figure 10A:
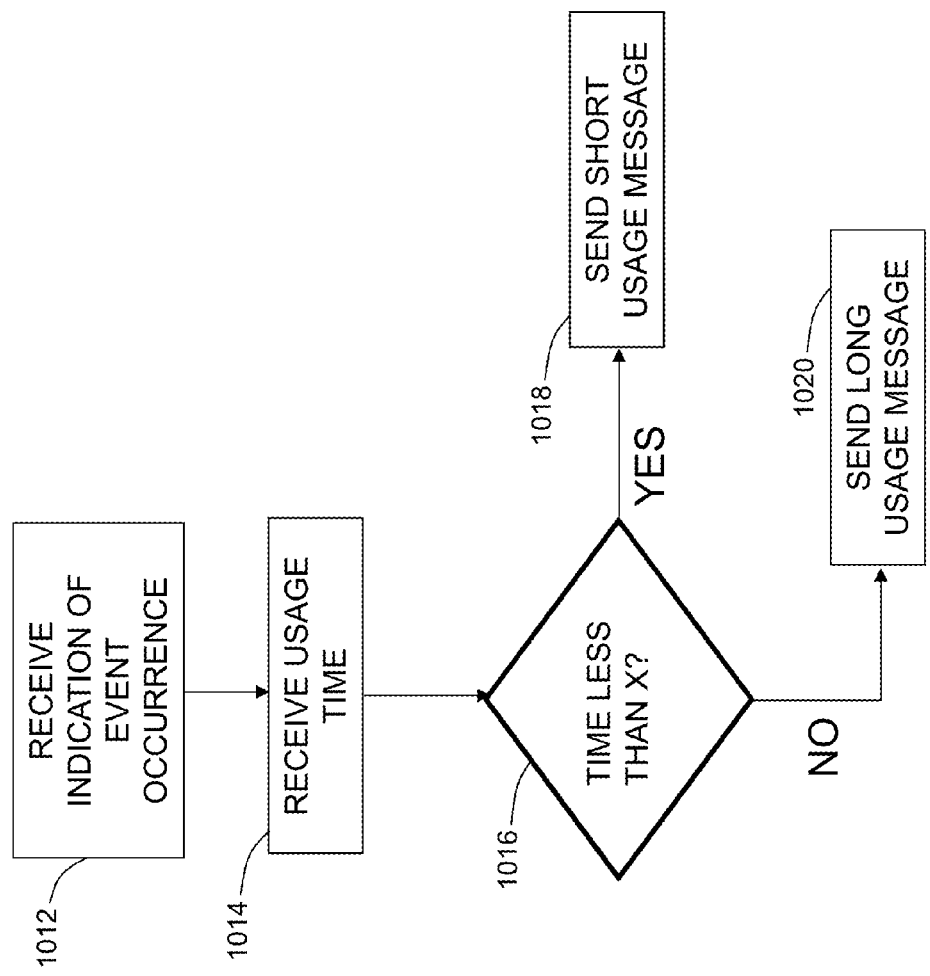
FIGS. 10A-10D show flow diagrams of methods for generating content based on usage parameters.

Referring to FIG. 10A, there is shown a flow diagram of a method for generating content for a message based on duration of use. In step 1012, an indication that an event has occurred is received. For example, the user deactivated the vibration unit of the sexual massager. In step 1014, a usage time parameter is received (e.g., in minutes or seconds of use during the last usage). In step 1016, a determination is made as to whether the usage time is less than a predetermined time interval (e.g., 120 seconds) depicted as "X" in FIG. 10A. If the usage is less than the predetermined time interval (threshold), then a short usage item of content is sent to the target(s) in a message in step 1018. If the usage is greater than or equal to the predetermined threshold, then a long usage item of content is sent to the target(s) in a message in step 1020. In some embodiments, multiple time thresholds may be used, such that a short item of content is sent to the target if the usage time is below a first threshold, and an "extra long" item of content is sent if the usage time exceeds a second predetermined threshold. For example, if the usage time is less than 120 seconds, the content of the message sent to the target may read "That was quick!" or "In a hurry?" If the usage time exceeds the second predetermined threshold (e.g., 1200 seconds), the "extra long" item of content in a message sent to the target(s) may include a phrase like "Way to take your time" or "Finally!"

Figure 10B:
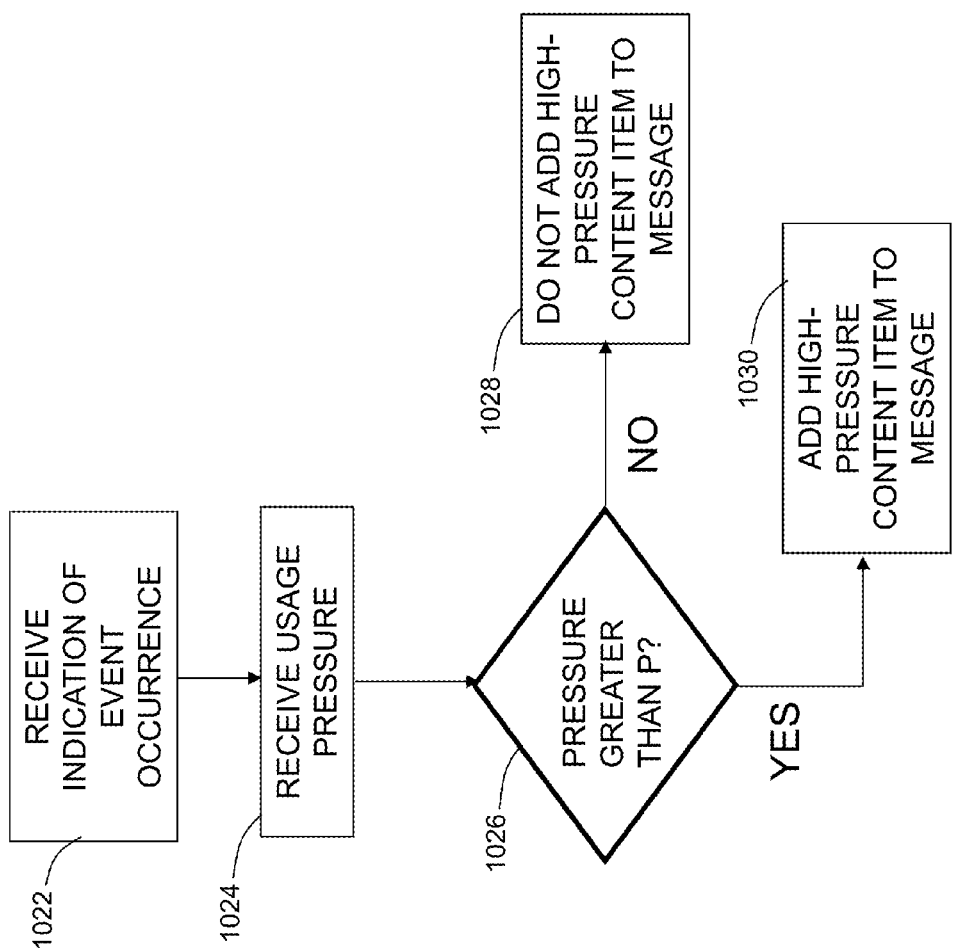

Referring to FIG. 10B, there is shown a flow diagram of a method for generating content for a message based on grip pressure. In step 1022, an indication that an event has occurred is received. In step 1024, a usage pressure reading is received (e.g., in maximum pounds of force exerted on the housing during the last usage). This may be implemented by locating a strain gauge in the housing, such that the level of a user's grip can be measured. In step 1026, a determination is made as to whether the usage pressure is greater than a predetermined threshold (e.g., 110 pounds) depicted as "P" in FIG. 10B. If the usage pressure is less than the predetermined threshold, no additional content item is added to the message in step 1028. If the usage is greater than or equal to the predetermined threshold, then a high pressure content item is added to the message that is sent to the target(s) in step 1030. In some embodiments, the high pressure content item may include a phrase like "Nice grip", "I love it when you hold me tight!" etc.

Figure 10C:
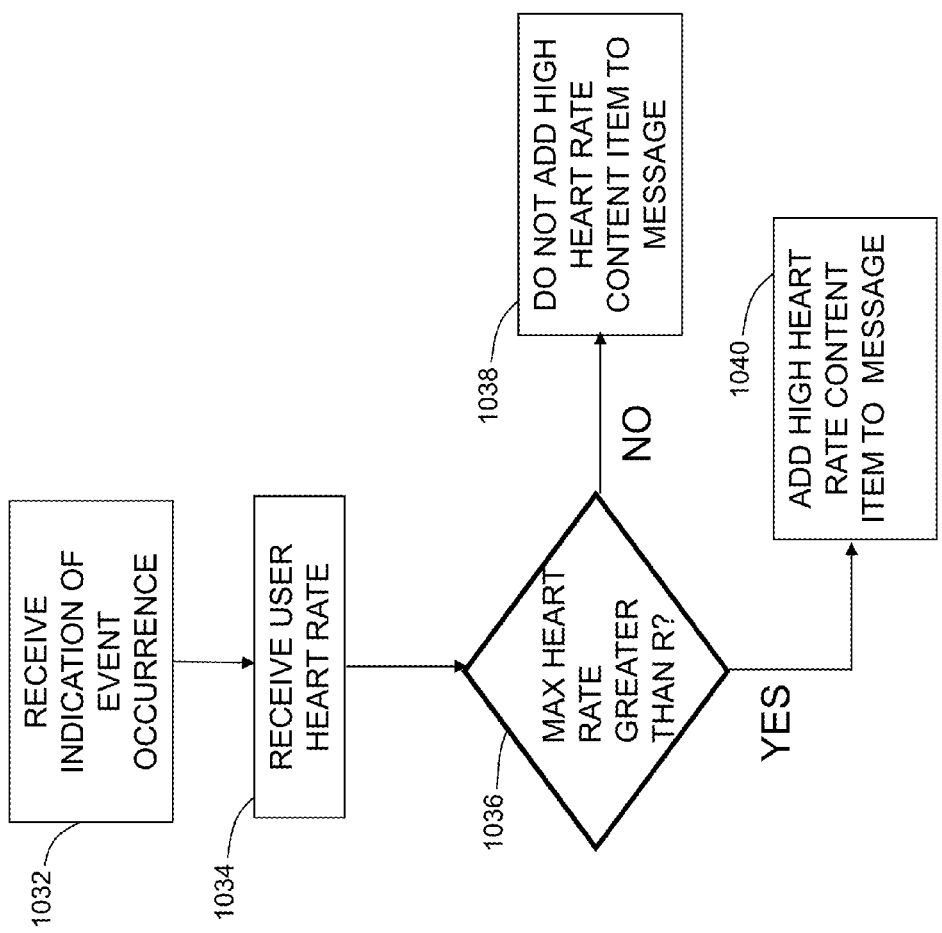

Referring to FIG. 10C, there is shown a flow diagram of a method for generating content for a message based on user heart rate. In step 1032, an indication that an event has occurred is received. In step 1034, a user maximum heart rate is received (e.g., in beats per minute). This may be implemented by locating a biometric sensor in the housing, such that the maximum heart rate of the user while using the sexual massager can be measured. In step 1036, a determination is made as to whether the maximum heart rate is greater than a predetermined threshold (e.g., 140 beats per minute) depicted as "R" in FIG. 100. If the heart rate is less than the predetermined threshold, then no additional content item is added to the message in step 1038. If the heart rate is greater than or equal to the predetermined threshold, then a high heart rate content item is added to the message that is sent to the target(s) in step 1040. In some embodiments, the high heart rate content item may include a phrase like "Great workout!", "You burned some calories that time!", etc. . . .

Figure 10D:
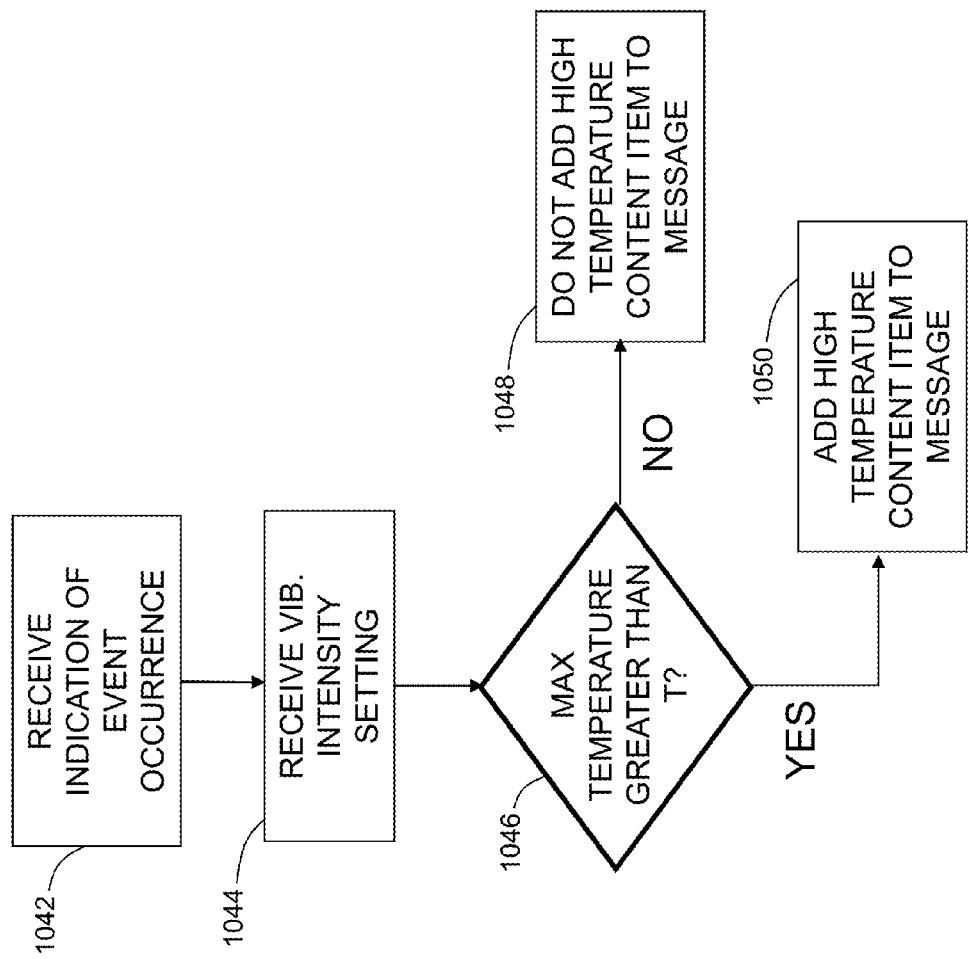

Referring to FIG. 10D, there is shown a flow diagram of a method for generating content for a message based on temperature setting. In step 1042, an indication that an event has occurred is received. In step 1044, a maximum temperature setting is received (e.g., in degrees Celsius and/or Fahrenheit, etc.). This may be implemented by locating a temperature setting switch encoder in the housing, such that the maximum temperature setting of the heater/cooler of the sexual massager can be ascertained. In step 1046, a determination is made as to whether the maximum temperature setting is greater than a predetermined threshold (e.g., 35 degrees Celsius) depicted as "T" in FIG. 10D. If the temperature setting is less than the predetermined threshold, then no additional content item is added to the message in step 1048. If the maximum temperature setting is greater than or equal to the predetermined threshold, then a high temperature setting content item is added to the message that is sent to the target(s) in step 1050. In some embodiments, the high temperature setting may include a phrase like "That was HOT!", "You really raised the heat!", etc. In some embodiments, minimum temperature setting can be substituted, and phrases modified accordingly, like "That was cool!" In addition to the temperature setting switch encoder, other encoders for other user settings may also be present in sexual massager 100. These include, but are not limited to, a vibration setting switch encoder, and a light setting switch encoder. The various encoders record the current user settings such that they can be relayed to the application server. In some embodiments, the current user settings may be managed by the computer 109, instead of, or in addition to, using encoders, and these settings may be made available to the application server as system calls.

In embodiments, one or more of the items of content generated in FIGS. 10A-10D may be appended together to make a composite message. For example, if short usage, high pressure, high temperature, and high heart rate are detected, a composite of content items for a message may be formed by appending content items from the respective usage parameters. For example, the message in the aforementioned case may read "That was quick! Nice Grip! Great workout! That was HOT!"

Referring now to FIG. 11, there is shown a repository—database table 1100 for storing and organizing items of content. It will be recognized that the repository table is an example, and any other suitable repository is included within the scope of the invention. In practice, the repository for storing the content items may be at least one database, table, or other storage device. In some embodiments, when a user enters a customized content item, it may be stored and made available not only to that user, but to other users as well. Table 1100 includes column 1102 which stores an intensity value, column 1104 which stores a rating, column 1106 which stores an attribute word, and column 1108 which stores a content item or identifier/address of a content item (e.g., a link to a website, such as shown in the content item column of row 1128). For example in some embodiments, the content may further include a video, image, other content types, and/or a uniform resource locator pointing thereto. Other embodiments may include more or fewer columns and/or rows. The intensity column 1102 may represent a level of "eroticism" of a content item (e.g., ranked similarly to the categorizations on a scale like the "random from category" schema). The intensity ranking may be entered by a user or an administrator of the application server. In some embodiments, a crowdsourcing approach may be used to determine the intensity ranking (e.g., by tabulating votes from a plurality of users regarding the intensity of various phrases). Based on a user's personal preference, messages of a particular intensity value may be presented. For example, if a user prefers to receive mild (non-erotic) messages, then low intensity messages are presented to the user. The rating column 1104 may represent the aggregate user ratings for a particular content item in terms of how much a particular content item is liked. In some embodiments, the rating may be, for example, without limitation, on a scale from 1 to 10, with 10 being most favorable, and 1 being least favorable. The attribute word column 1106 contains an attribute word. The attribute word may be a bitmask indicating various usage parameter data associated with the content item. Examples of usage parameters include, for example, long usage, short usage, high pressure, low pressure, high moisture, low moisture, high heat, low heat, etc. For example, if the content item is intended for short usage (e.g., 1018 of FIG. 10A), then bit 0 of the attribute word may be set, as is the case for row 1122. If the content item is intended for high pressure, as in the case of 1030 of FIG. 10C, then bit 1 of the attribute word may be set, as is the case with row 1126.

Figure 12:
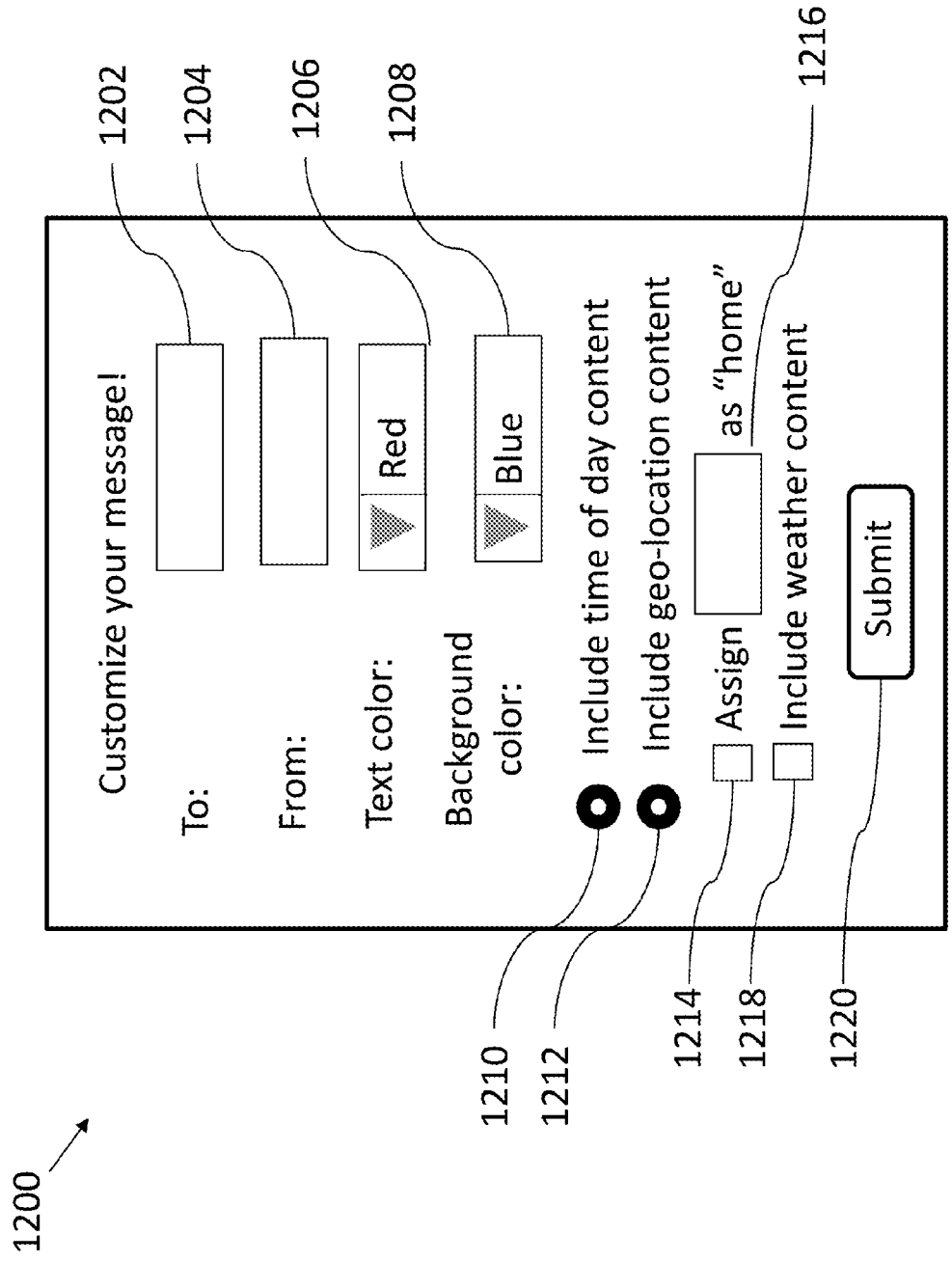
FIG. 12 shows a user interface for prompting a user to enter other customizations for a message.

Referring now to FIG. 12, there is shown a user interface 1200 for prompting a user to enter other customizations for a message. It will be recognized that any customization options are included within the scope of the invention. Those discussed herein are examples, and in embodiments, more, fewer, or other options may be available.

Figure 13A:
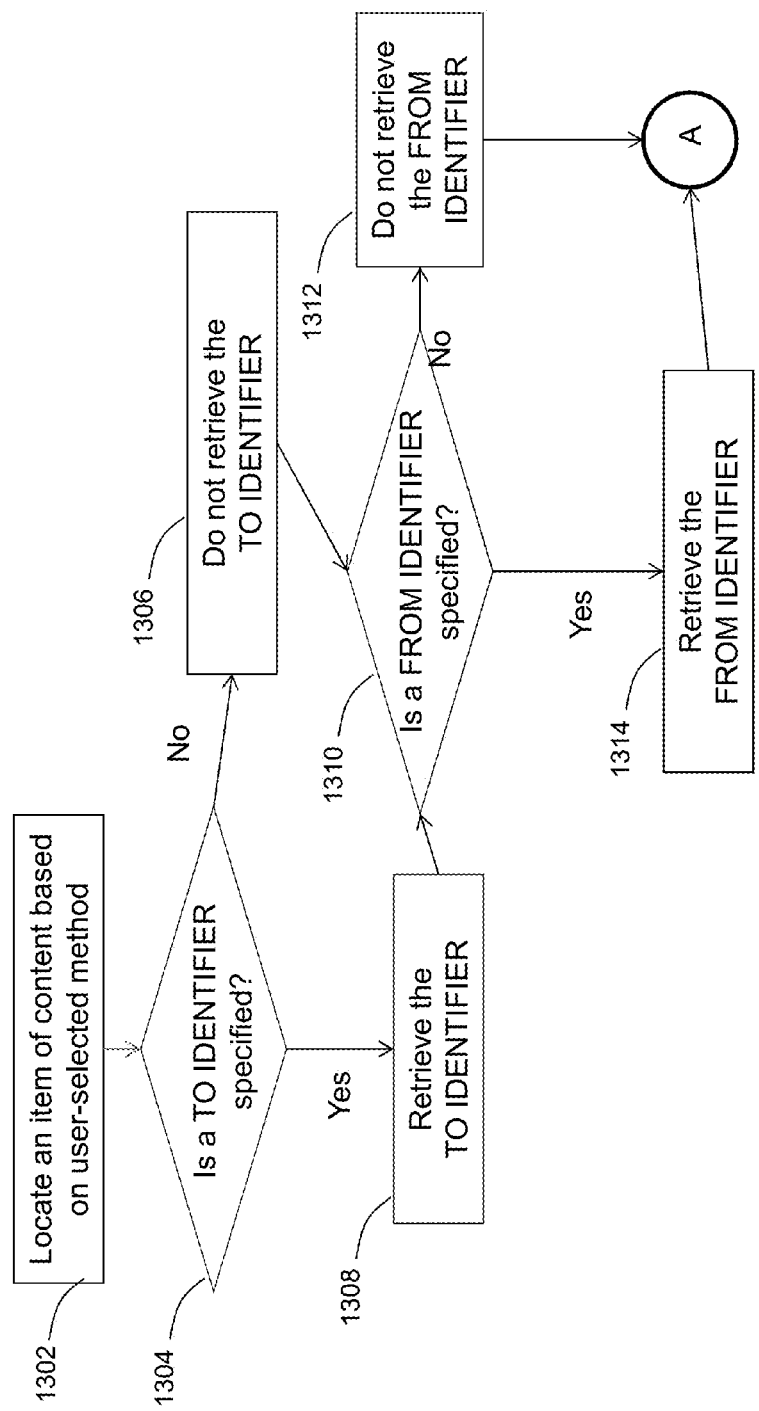
FIGS. 13A and 13B show a flow diagram of a method for appending customized content items to content items determined according to a user-selected method.
Figure 13B:
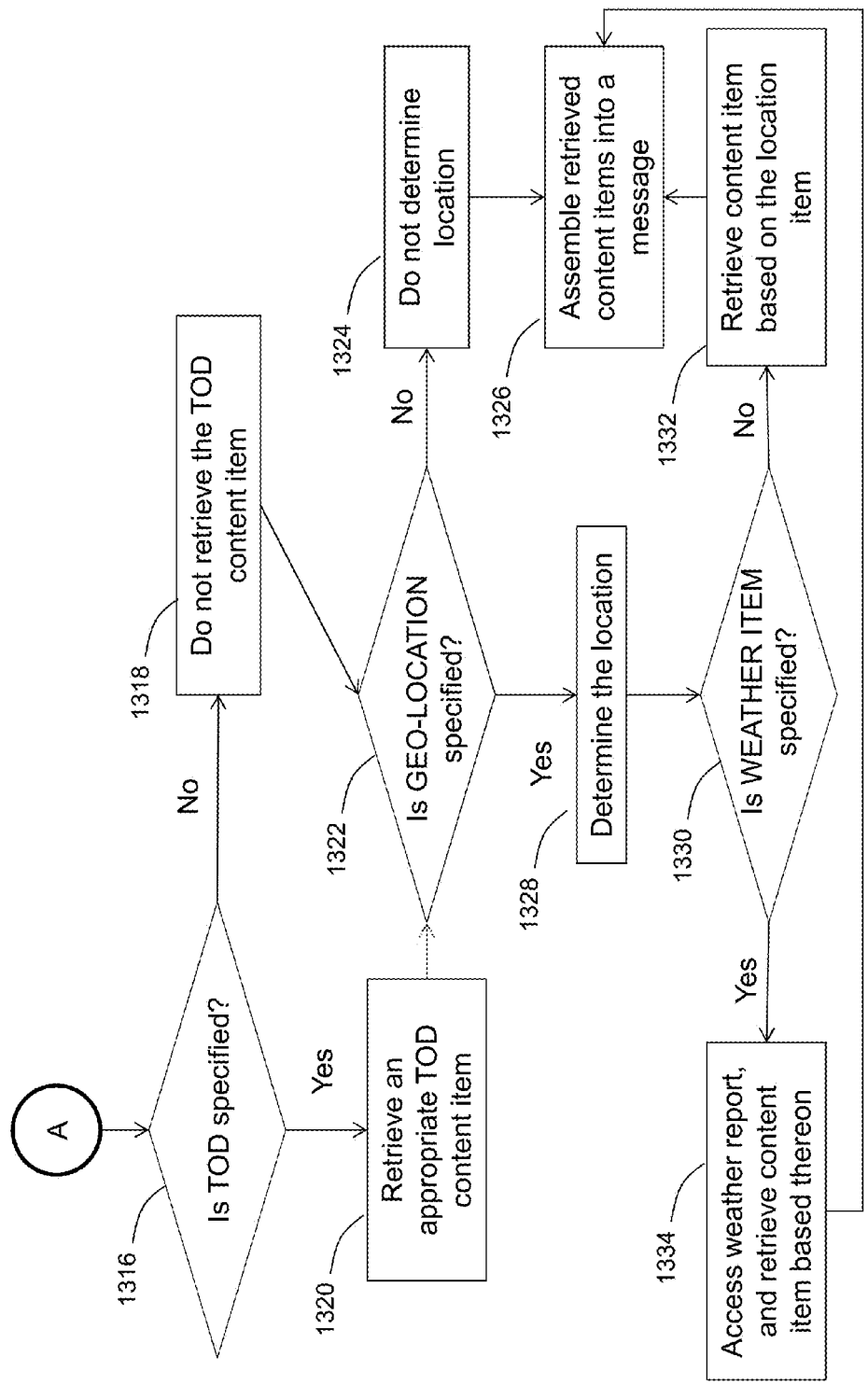

At 1202, there is shown a mechanism (e.g., a field) for a user to enter a recipient name/identifier (or name/identifier of the user or a third party, e.g., user of third party client device 206 of FIG. 2) so the content of a message may include her/his name appended thereto. This recipient name/identifier is also referred to herein as a "to" identifier as it typically serves to identify to whom the message is directed. In some embodiments, one or more items of content (e.g., a phrase) may be stored in the repository with a variable identifier to allow substitution of the user-defined "to" identifier. For example, in row 1124 of FIG. 11, the phrase "Hey $, that was too fast!" contains the symbol "$", which serves as a placeholder for a "to" identifier, if specified by the user. Supposing the user specifies the name "Amanda," then the string of row 1124 may render as "Hey Amanda, that was too fast!" Conversely, if no name string is specified, the string of row 1124 may render as "Hey, that was too fast!" In the alternative, or in addition, in some embodiments, rather than the "to" identifier be substituted for a place holder in a particular item of content, a method as shown in FIGS. 13A-13B may determine whether a "to" identifier was received, and if so, append it as a content item to the other content item(s) of the message.

At 1204, there is shown a mechanism (e.g., a field) by which the user can enter a "from" name/identifier. This identifier is referred to as a "from" identifier as it typically serves to indicate from whom the message will appear to come, i.e. the "sender". In some embodiments, a user may enter a "from" identifier, which may be enabled in the same manners as the "to" identifier as described herein above.

At 1206, there is shown a mechanism (e.g., a drop box) for the user to elect a color in which to render any textual content in the message. At 1208, there is shown a mechanism (e.g., a drop box) to receive a selection of the color in which to render the background of the content of the message. Other such selections could include font type, line spacing, a background image, etc.

At 1210, there is shown a mechanism (e.g., a radio button) for the user to elect to receive a time of day (TOD) content item (e.g., a phrase, etc.) appended to other determined content item(s) in the message. For example, if the TOD of the detected event occurrence is between the hours of 5:00 am and 9:00 am, a "Good morning!" phrase may be included in the message. See, for example, 1502 of FIG. 15.

At 1212, there is shown a mechanism (e.g., a radio button) for the user to elect to receive geographic location ("geo-location") and/or weather-related content item(s) appended to other determined content item(s) in the message. For example, through a location-aware system/technology, such as global positioning satellite (GPS) signal (i.e. GPS system 113 of FIG. 1), Wi-Fi triangulation, cellular signal triangulation, IP-based location services (based on the IP address of the sexual massager), or other suitable technology now known or hereafter developed, the geographic location of the sexual massager may be detected during use (e.g., the massager is powered on, or the vibration unit is activated, etc.), and/or at the time of the event occurrence, etc. A geographic location content item may be appended to other determined content item(s) of the message, for example, the text of "Wow, that was a fun time in Acapulco!" and/or a photograph of a beach. In some embodiments, the user can elect to assign a name/title to one or more locations. For example, at 1214, there is shown a check box for the user to elect to associate the word "home" with a geographic location to be entered to field 1216. In some embodiments, more associations can be made, like a particular location as "John's house", etc. This functionality enables more sexualized geographic location content items, like "Haven't had that much fun at home in a while". At 1218, there is shown a mechanism (e.g., a check box) for the user to elect to receive weather-related content items. In some embodiments, a weather report can be accessed (e.g., by the application server from a website through the Internet) for the sensed geographic location to enable weather-related content items like "What a way to spend a rainy day!" In some embodiments, textual items of content (e.g., a phrase, etc.) may be stored in the repository with a variable identifier to allow substitution of the generic or user-defined location name/identifier. For example, the stored content item may read: "Wow, that was a fun time in #", with the geographic location entered in place of the # when the content item is included in a message. See, for example, 1508 of FIG. 15. Alternatively, or in addition, geographic and/or weather items of content may be entered to a message through process, for example, as shown in FIGS. 13A-13B.

At 1220, there is shown a mechanism (e.g., a button) for submitting the information for transmission to the application server (e.g., 210 of FIG. 2) through the network (e.g., 208 of FIG. 2).

Referring now to FIGS. 13A and 13B, there is shown a flow diagram of a method for appending customized content items to content items determined according to a user-selected method. At 1302, an item of content is located based on the user-selected method (e.g., random, "random from category", customized, usage parameter detection, etc.). At 1304, it is determined whether a TO IDENTIFIER was specified (e.g., at 1202 of FIG. 12). If not, at 1306, a TO IDENTIFIER is not retrieved. If so, at 1308, the TO IDENTIFIER is retrieved. The process then proceeds to 1310, where it is determined whether a FROM IDENTIFIER was specified (e.g., at 1204 of FIG. 12). If not, at 1312, a FROM IDENTIFIER is not retrieved. If so, at 1314, the FROM IDENTIFIER is retrieved. The process then proceeds to 1316, where is it determined whether TIME OF DAY was enabled (e.g., at 1210 of FIG. 12). If not, at 1318, no TIME OF DAY content item is retrieved. If so, at 1320, an appropriate TIME OF DAY content item is retrieved. The process then proceeds to 1322 where it is determined whether GEO-LOCATION was enabled (e.g., at 1212 of FIG. 12). If not, at 1324, no geo-location is determined, and the process proceeds to 1326 where the retrieved content items are assembled into a message. If so, at 1328, a geo-location is determined, and the process proceeds to 1330, where it is determined whether WEATHER ITEMS was enabled (e.g., at 1218 of FIG. 12). If not, at 1332, an appropriate content item is retrieved based on the location, and the process proceeds to 1326 where the retrieved content items are assembled into a message. If so, at 1334, a weather report is accessed, and a content item based on the weather report is retrieved. The process then proceeds to 1326 where the retrieved content items are assembled into a message. It will be recognized that this method is an examples, and that any suitable method is included within the scope of the invention. It will be recognized that in some embodiments of the invention, more or fewer steps could be included, some of the steps may be performed simultaneously, and/or the order of the steps may be different.

Figure 14:
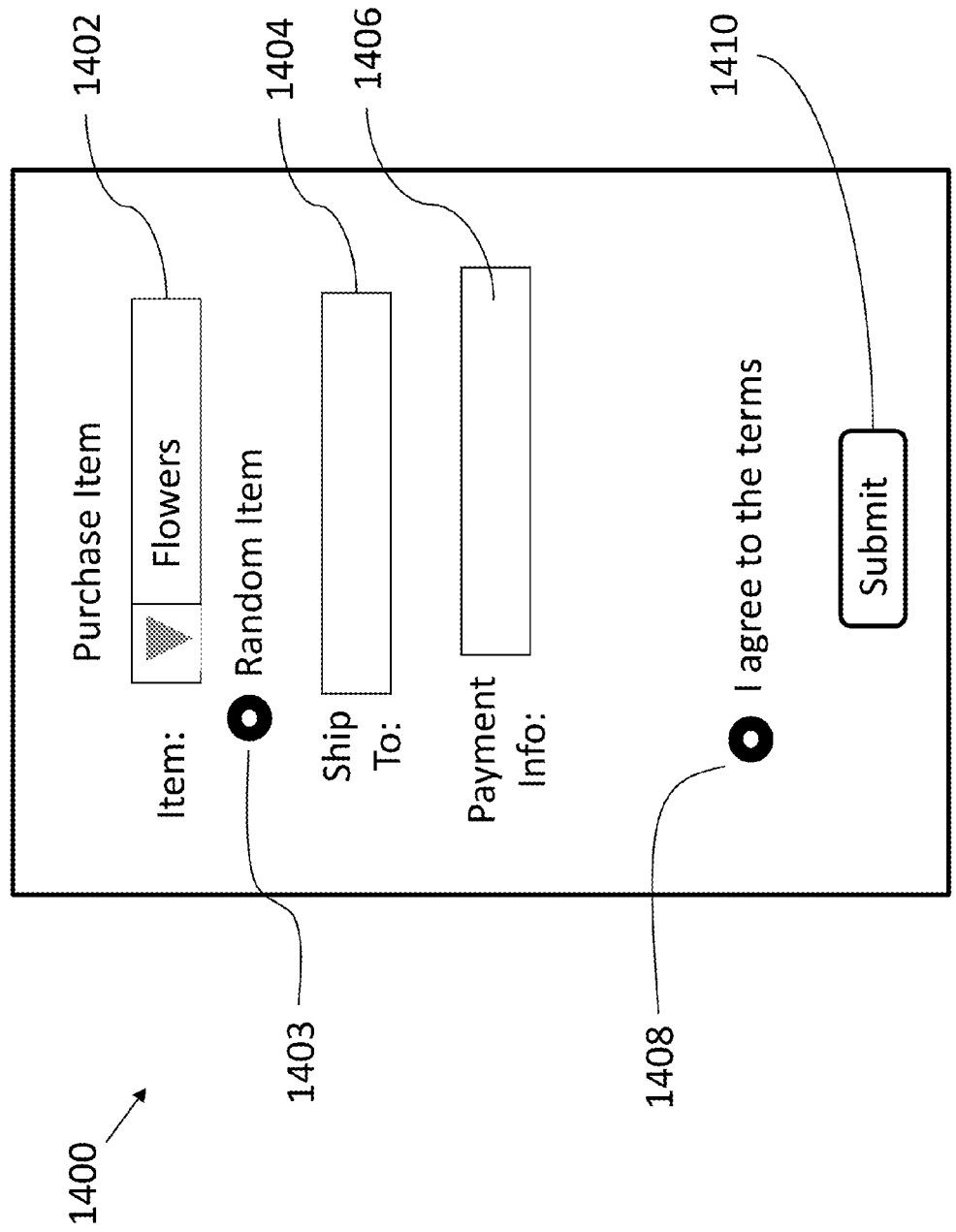
FIG. 14 shows a user interface for prompting a user to enter information for a purchase order to accompany a message.

Referring now to FIG. 14, there is shown a user interface 1400 for prompting a user to enter information for execution of an automated purchase to accompany a message in response to an event occurrence. Upon the system receiving a signal from the massager, a purchase may be executed. The order may be for an object (or service), for example, a floral arrangement, which is mailed or delivered to the user's home address with a paper note having the content of the message thereon. At 1402, there is shown a mechanism (e.g., a drop down box) by which the user can select the object(s) to be purchased (e.g., flowers). In some embodiments, at 1403, there is shown a mechanism (e.g., a button) for selecting a random item from a pool of items. For example, the pool of items may include, candy, flowers, fruit baskets, or other gifts. With the random option selected, the user does not know what the gift is until it is received. At 1404, there is shown a mechanism (e.g., a field) by which the user may enter shipping information. At 1406, there is shown a mechanism (e.g., a field) by which the user may enter payment information, such as credit card information. At 1408, there is shown a mechanism (e.g., a radio button) by which the user may select that she/he agrees to the terms of the sale. At 1410, there is shown a mechanism (e.g., a button) for submitting the information for transmission to the application server (e.g., 210 of FIG. 2) through the network (e.g., 208 of FIG. 2). In embodiments, the application server 210 performs the necessary e-commerce transactions to complete the sale, for example, communicating order and payment information to a third-party vendor's website. When the event occurs, an automated purchase is performed in response thereto.

Figure 15:
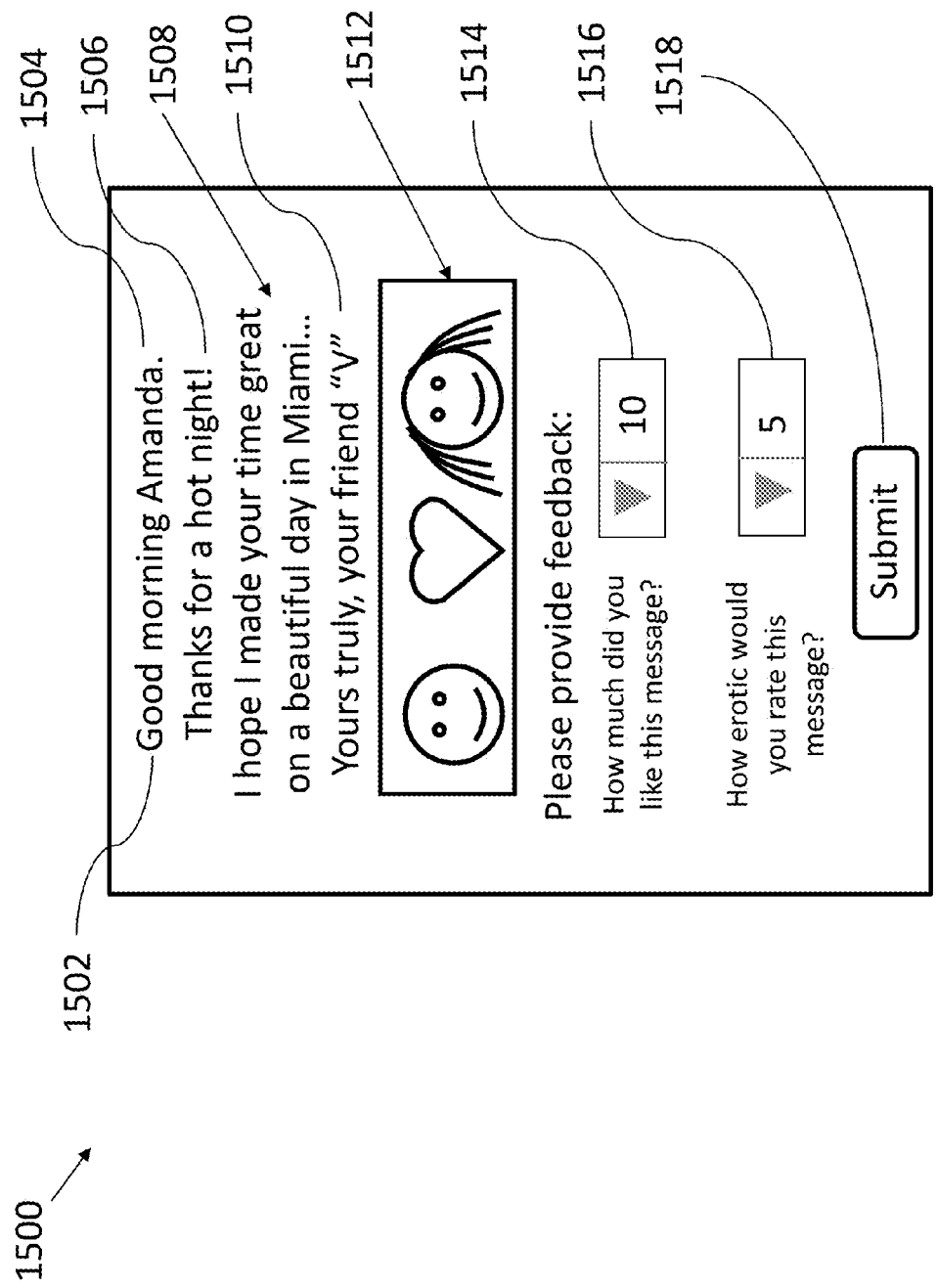
FIG. 15 shows a user interface for displaying content of a message received at a target.

Referring to FIG. 15, there is shown a user interface 1500 for displaying content of a message received at a target. At 1502, there is shown a time of day content item. At 1504, there is shown a name of a user (a customization previously entered by the user). At 1506, there is shown a high heart rate item of content. At 1508, there is shown a composite location and weather item of content. At 1510, there is shown an identifier/name of a "sender" (entered previously as a customization by the user). At 1512, there is shown a photographic item of content having a 5 rating.

Still referring to FIG. 15, in some embodiments, the message received at the target may facilitate acquisition of feedback from the user. At 1514, there is shown a mechanism (e.g., a drop box) for the user to input a rating of the message based, for example, on whether she/he liked or disliked the message, whether the user thought the message was appropriate considering the use of the sexual massager, or any other suitable criteria. Ratings received by such mechanism may be aggregated by the application server and used to rank content items. The rankings may in turn be used to determine which content items are presented in future messages. An example of a ranking schema is, for example, based on favorability, e.g., at 1514, as determined by the voting of a plurality (one or more) of users. The content items may be ranked in a prioritized manner, and the content items deemed most favorable are prioritized higher for inclusion in messages. Upon the application server receiving such feedback, the system can use a learning mechanism to enhance the messages sent to the user, and to other users. At 1516, there is shown a mechanism (e.g., a drop box) for the user to input a categorization of the message (for example, to help categorize the message according to the schema for "random from category", etc.). So embodiments of the invention include crowdsourcing items of content for determination of content to include in future messages. At 1518, there is shown a mechanism (e.g., a button) for the user to submit the feedback for transmission to the application server (e.g., 210 of FIG. 2) through the network (e.g., 208 of FIG. 2).

In some embodiments, the user interfaces depicted herein may be rendered via, e.g., an HTML web page (or other suitable mechanism), on a personal computer, tablet, smart phone, or other suitable device. When a user clicks any of the submit buttons, the information input may be sent to the application server (e.g., 210 of FIG. 2) through the network (e.g., 208 of FIG. 2). In some embodiments, the features of the user interfaces may be arranged differently from the arrangements depicted herein. In some embodiments, more or fewer features may be included on the user interfaces depicted herein, or the features shown on each user interface could be split among a plurality of user interfaces. In some embodiments, the features of user interfaces depicted herein could be combined to appear in a single interface. In some embodiments, mechanisms shown on the user interfaces or otherwise associated with the sexual massager may be substituted with any other suitable mechanisms. These user interfaces are examples, and the scope of the invention includes any interface capable or receiving the information described herein.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A system comprising:
    a sexual massager, the sexual massager comprising:
        a massage unit, and
        a massage unit on/off switch,
    a server in communication with the sexual massager, the server comprising:
        a bus;
        a memory medium coupled to the bus;
        a processor coupled to the bus, the processor configured to execute instructions, stored on the memory medium, to:
            receive a set of preferences from a user for a desired message, wherein the set of preferences include:
                a content selection method for the desired message;

a message type of the desired message, and
a target to which the desired message is to be sent,
detect a deactivation of the massage unit by the massage unit on/off switch, based on data received over a network from the sexual massager;
assemble at least one message, of the message type, with at least one item of content selected according to the content selection method; and
send the assembled at least one message of the message type to the target in response to the detection of the occurrence of the deactivation;
wherein the target comprises at least one of: a telephone number, an email address, a voicemail box, a social media receptacle, or an instant message inbox.

2. The system of claim 1, the processor further configured to execute instructions, stored on the memory medium to select, for inclusion in the at least one message, the at least one item of content based on a reading of at least one usage parameter by a usage parameter detector of the sexual massager.

3. The system of claim 2, wherein the at least one usage parameter detector comprises at least one of a sensor, an encoder, and a timer.

4. The system of claim 1, the memory medium further comprising a repository of said at least one item of content.

5. The system of claim 4, the processor further configured to execute instructions, stored on the memory medium, to select, for inclusion in the at least one message, the at least one item of content based on a rating associated with each of the at least one item of content in the repository.

6. The system of claim 1, the processor further configured to execute instructions, stored on the memory medium, to facilitate a purchase in response to the occurrence of the deactivation.

7. The system in accordance with claim 1, wherein the at least one item of content includes at least one of: text, an image, a video, an audio file, a webpage, or a website link; and wherein the at least one message type is at least one of an email message, a text message, an instant message, a multimedia message, a voice message, a voice mail message, a video message, an automated telephone call, a voice-over IP call, a social media message, a social media post, or a blog post.

8. The system of claim 2, wherein the at least one usage parameter comprises at least one of: a heart rate, a blood pressure, a pulse, a body temperature, a skin conductivity, an amount of moisture, a grip pressure, a vibration intensity setting, a vibration pattern setting, a light setting, a temperature setting, and a duration between an activation and a deactivation of a vibration unit of the sexual massager.

9. The system of claim 1, wherein the at least one item of content is a first item of content selected for inclusion in the at least one message when a measurement of a usage parameter is greater than a predetermined level, and wherein the at least one item of content is a second item of content selected for inclusion in the at least one message when the measurement of the usage parameter is less than the predetermined level.

10. The system of claim 1, the processor further configured to execute instructions of the content selection method, stored on the memory medium, to:
receive a specification of at least one category of items of content from the user; and
select the at least one item of content, for inclusion in the at least one message, from items of content associated with the at least one category of items specified by the user.

11. The system of claim 1, the processor further configured to execute instructions of the content selection method, stored on the memory medium, to:
receive the at least one item of content from the user, wherein the at least one item of content is at least one customized item of content.

12. The system of claim 1, the processor further configured to execute instructions, stored on the memory medium, to:
receive an identifier of the sexual massager, the identifier comprising at least one of: an alphanumerical/symbolic sequence, a barcode, a radio-frequency identification (RFID) tag, or a quick response (QR) code; and
establish an association between the sexual massager and a user account.

13. The system of claim 12, the processor further configured to execute instructions, stored on the memory medium, to store at least one of the message type, the target, and the content selection method in association with the user account.

14. The system of claim 1, further comprising a vibration unit.

15. The system of claim 14, further comprising a housing configured in a shape that mimics a human penis.

16. A system comprising:
a sexual massager, the sexual massager comprising:
a massage unit, and
a massage unit on/off switch; and
a server in communication with the sexual massager, the server comprising:
a bus;
a memory medium coupled to the bus;
a processor coupled to the bus, the processor configured to execute instructions, stored on the memory medium, to:
receive input from a user, the input comprising a set of preferences, wherein the set of preferences include:
a content selection method for a desired message,
a message type of the desired message,
a target to which the desired message is to be sent, and
an event to trigger sending of the desired message, the event comprising an amount of time following a deactivation of the massage unit, by the on/off switch, of the sexual massager;
detect an occurrence of the event based on data received over a network from the sexual massager;
assemble at least one message, of the message type, based on the content selection method;
send the at least one assembled message of the message type to the target in response to the detection of the occurrence of the event;
wherein the target comprises at least one of: a telephone number, an email address, a voicemail box, a social media receptacle, or an instant message inbox.

17. The system of claim 16, wherein the content selection method is selected from the group consisting of: customized, random, random-from-category, pre-set, and biometric parameter-based.

* * * * *